United States Patent [19]

Rotharmel et al.

[11] Patent Number: 5,305,860
[45] Date of Patent: Apr. 26, 1994

[54] REMOTE CONTROLLED VEHICLE DAMPER

[75] Inventors: John Rotharmel, Arlington Heights; Joseph Ergun, Itasca; Robert F. Bedsole, Berwyn; Joseph Cubalchini; Harold B. Hutter, both of St. Charles, all of Ill.

[73] Assignee: Maremont Corporation, Carol Stream, Ill.

[21] Appl. No.: 443,496

[22] Filed: Nov. 30, 1989

Related U.S. Application Data

[63] Continuation-in-part of Ser. No. 318,619, Mar. 3, 1989, abandoned.

[51] Int. Cl.⁵ .............................................. F16F 9/46
[52] U.S. Cl. ........................... 188/299; 188/322.15; 188/322.22; 188/319; 280/707
[58] Field of Search ............. 188/299, 322.22, 322.15, 188/322.13, 322.14, 319, 318, 317, 281, 282, 280, 286, 285, 287, 289; 280/707; 267/64.15, 64.11

[56] References Cited

U.S. PATENT DOCUMENTS

| 4,527,676 | 7/1985  | Emura et al. ............. | 188/299   |
| 4,620,619 | 11/1986 | Emura et al. ............. | 188/299 X |
| 4,635,765 | 1/1987  | Schmidt .................... | 188/299   |
| 4,671,392 | 6/1987  | Wössner ................... | 188/299   |
| 4,729,459 | 3/1988  | Inagaki et al. ........... | 188/299   |
| 4,754,855 | 7/1988  | Kuwara et al. ........... | 188/299   |
| 4,789,051 | 12/1988 | Kruckemeyer et al. ... | 188/299   |
| 4,865,148 | 9/1989  | Marumoto et al. ....... | 280/707 X |
| 4,926,983 | 5/1990  | Taubitz et al. ........... | 188/299   |

FOREIGN PATENT DOCUMENTS

| 0207409    | 6/1986  | European Pat. Off. . |
| 88307185.4 | 3/1988  | European Pat. Off. . |
| 3343338    | 11/1983 | Fed. Rep. of Germany . |
| 3727121    | 8/1987  | Fed. Rep. of Germany . |
| 3711807    | 4/1985  | Japan . |
| 6822956    | 4/1986  | Japan . |
| 2036246A   | 6/1980  | United Kingdom . |
| 8703775    | 2/1987  | United Kingdom . |

Primary Examiner—Douglas C. Butler
Attorney, Agent, or Firm—McAndrews, Held & Malloy, Ltd.

[57] ABSTRACT

A variable damping shock absorber is disclosed. The shock absorber has a two-wire electrical lead extending into the piston rod. The electrical energy provided by the lead drives a drive motor, which rotates in alternating directions depending on the setting of an internal switch that switches upon occurrence of voltage spike, which occurs when the motor has driven an internal rotatable valve as far as the valve can go within the confines of rotation permitted by the valving. The drive motor then drives an internal valve between an open and closed position, which in turn opens and increases, or closes or reduces, a path in fluid flow from one cavity to another as the piston moves within the shock absorber.

10 Claims, 11 Drawing Sheets

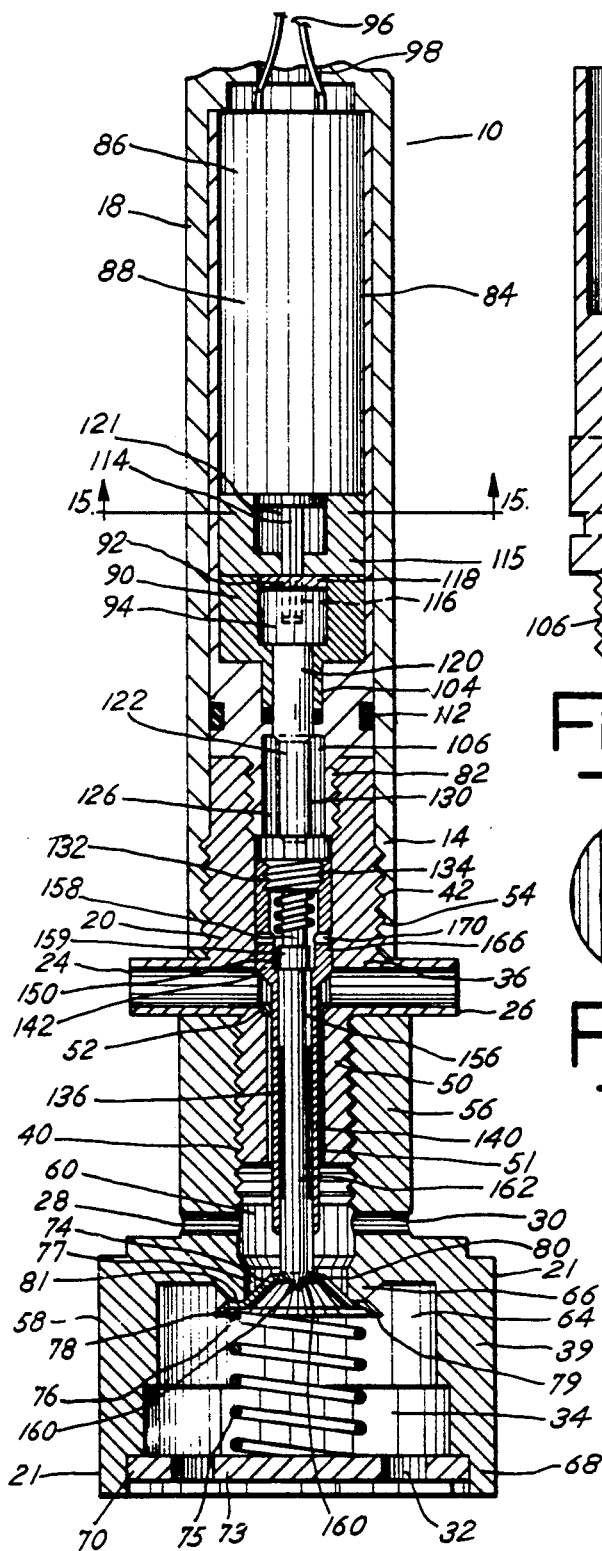
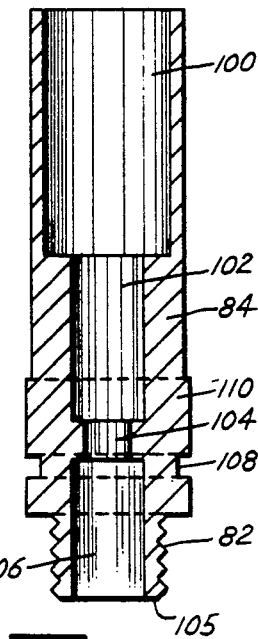
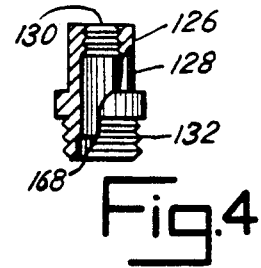
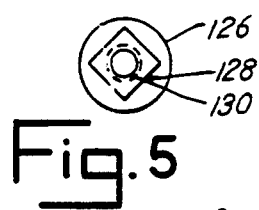
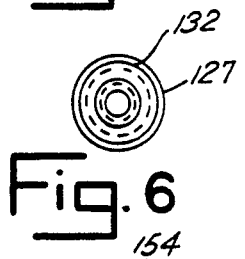
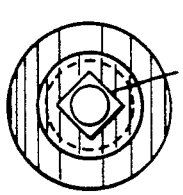

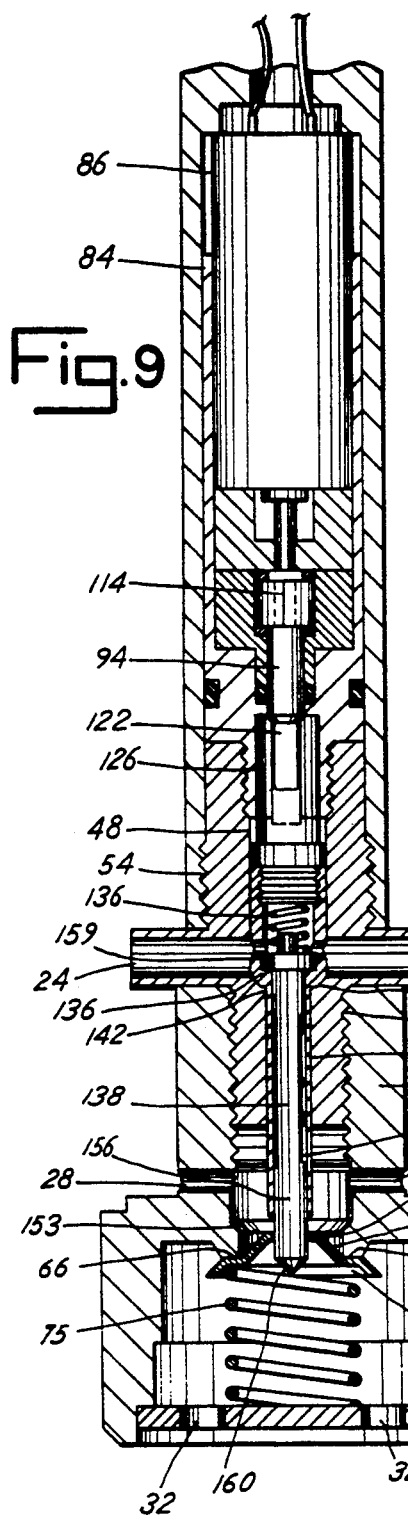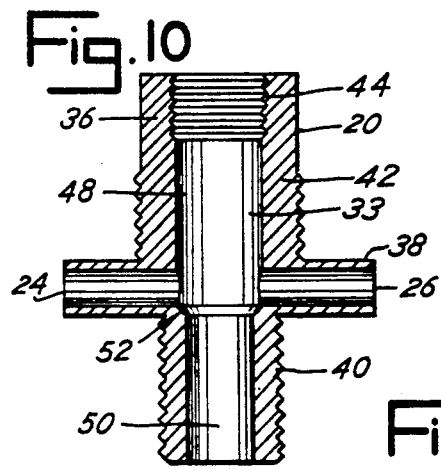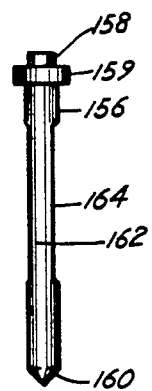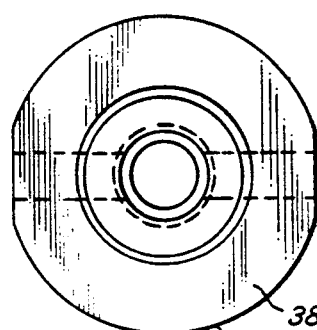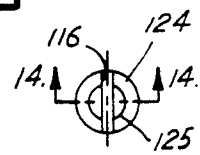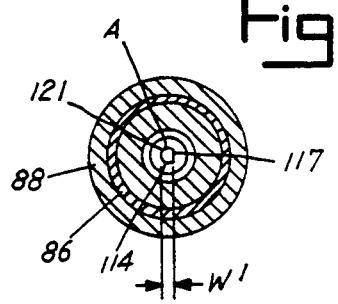

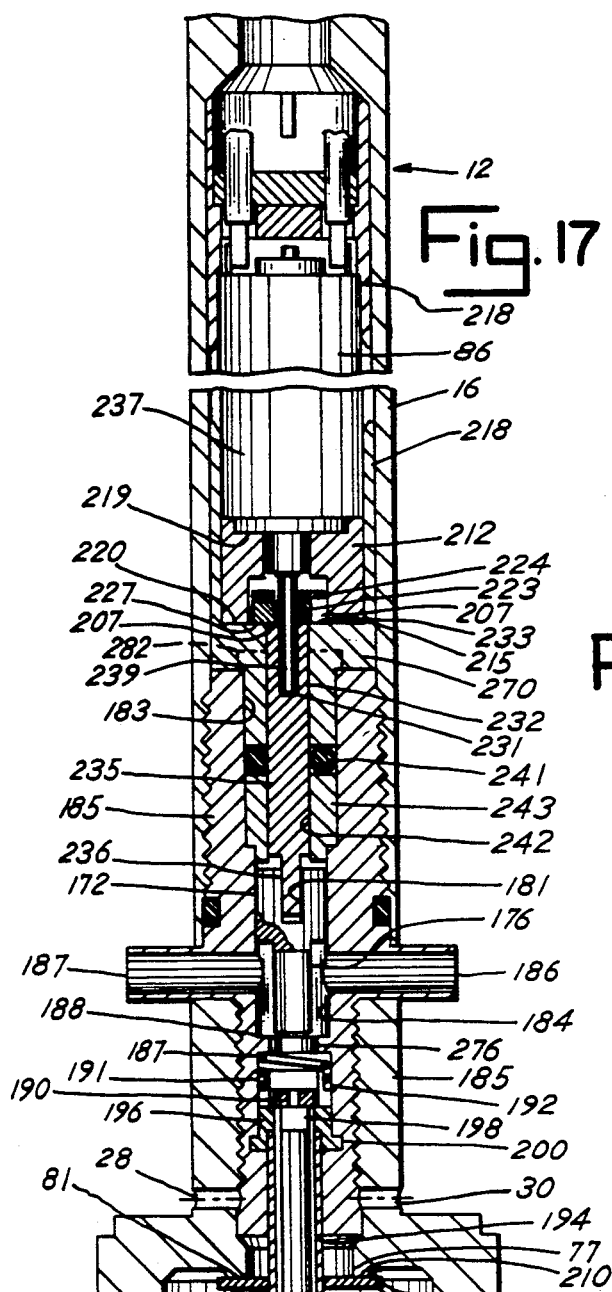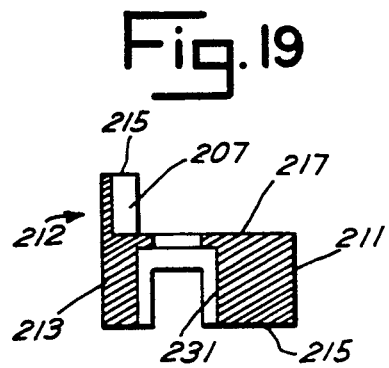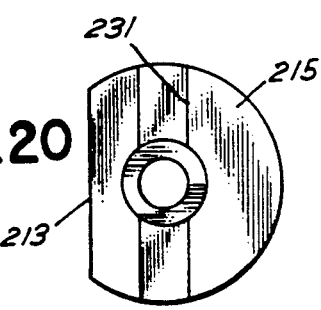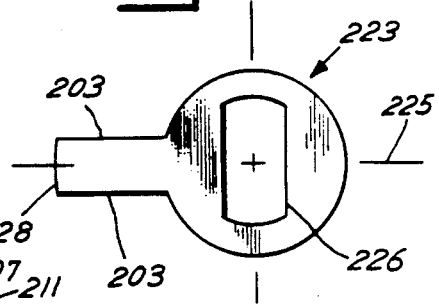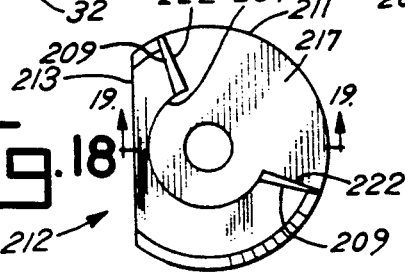

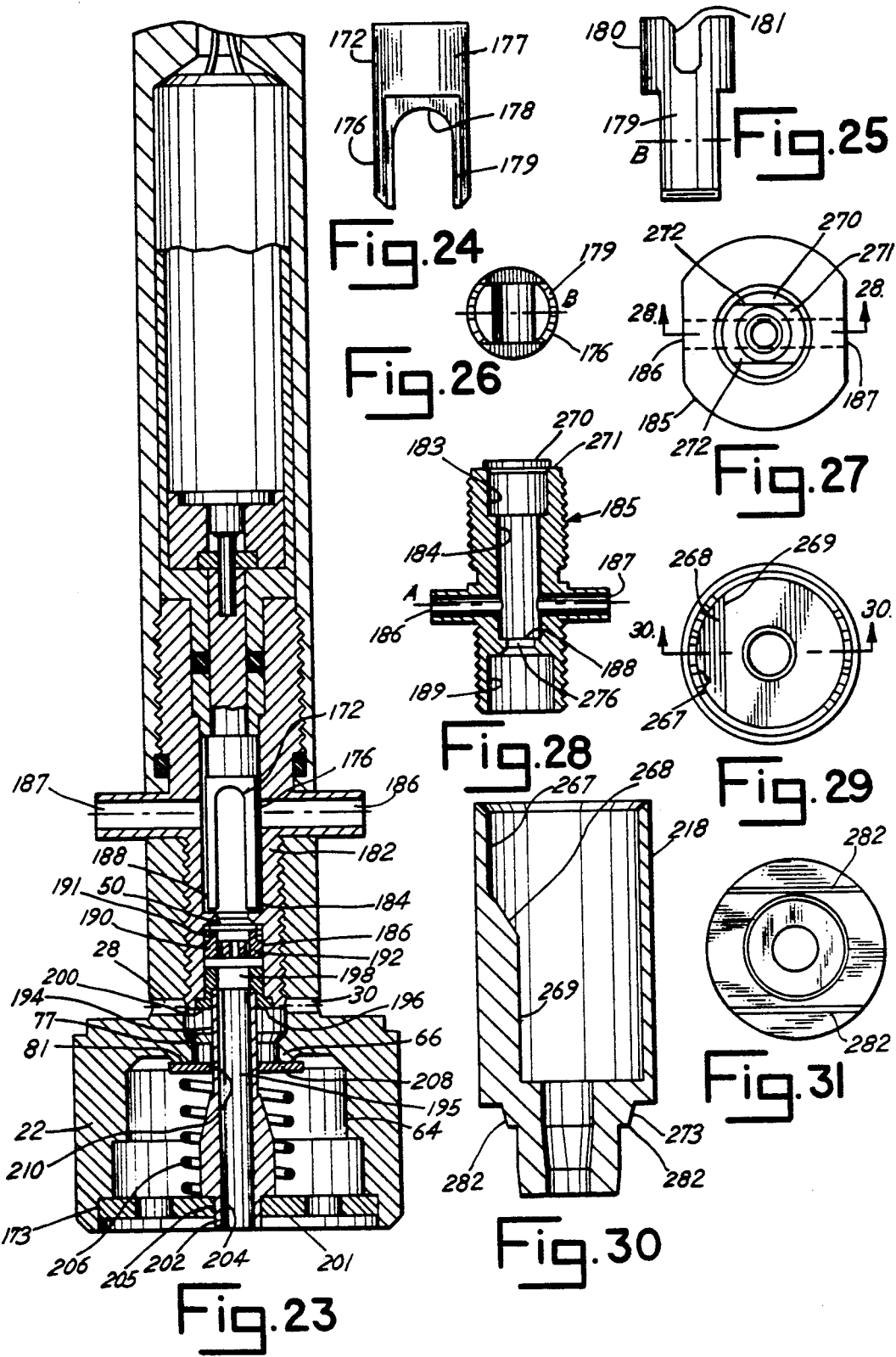

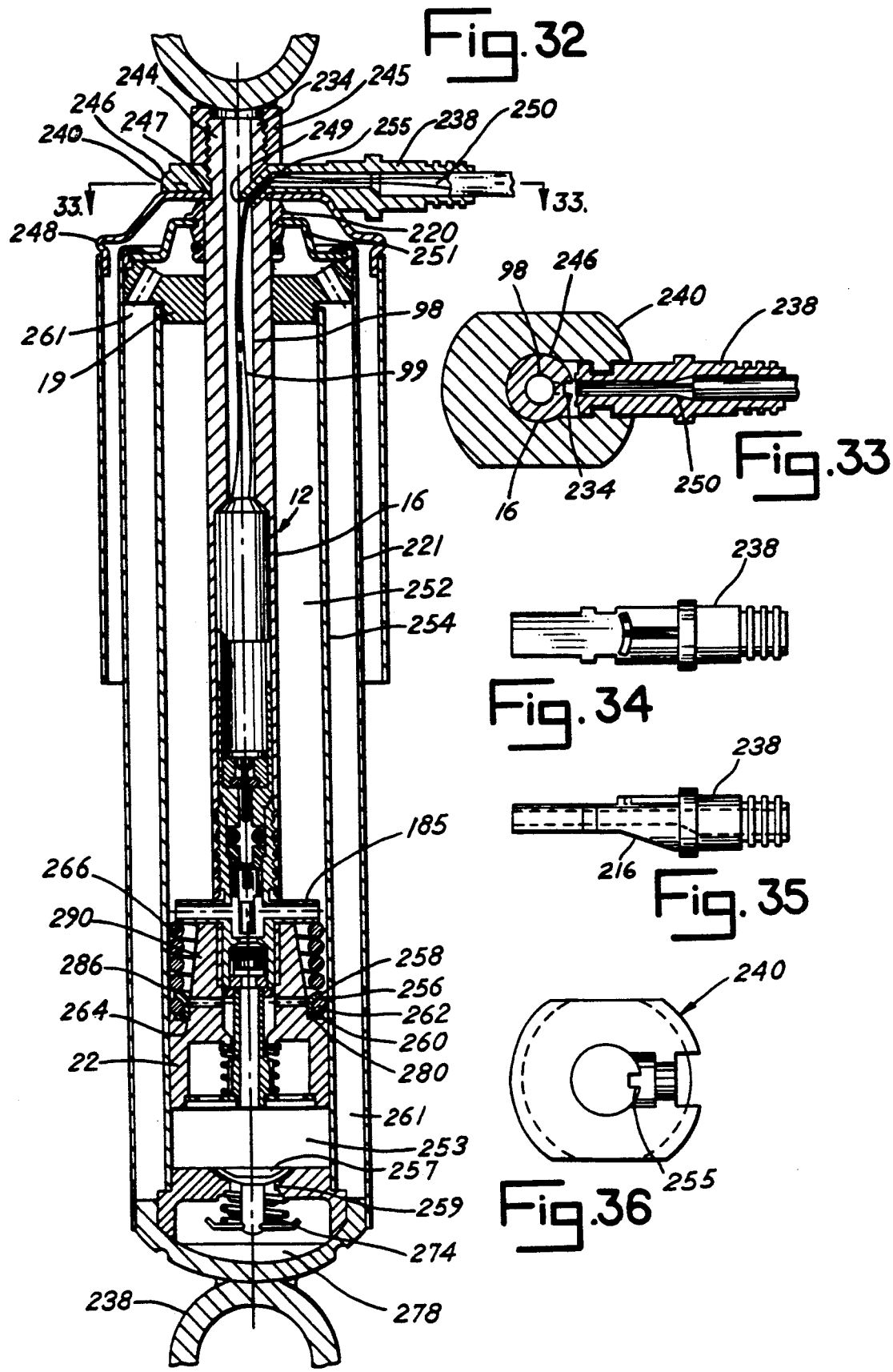

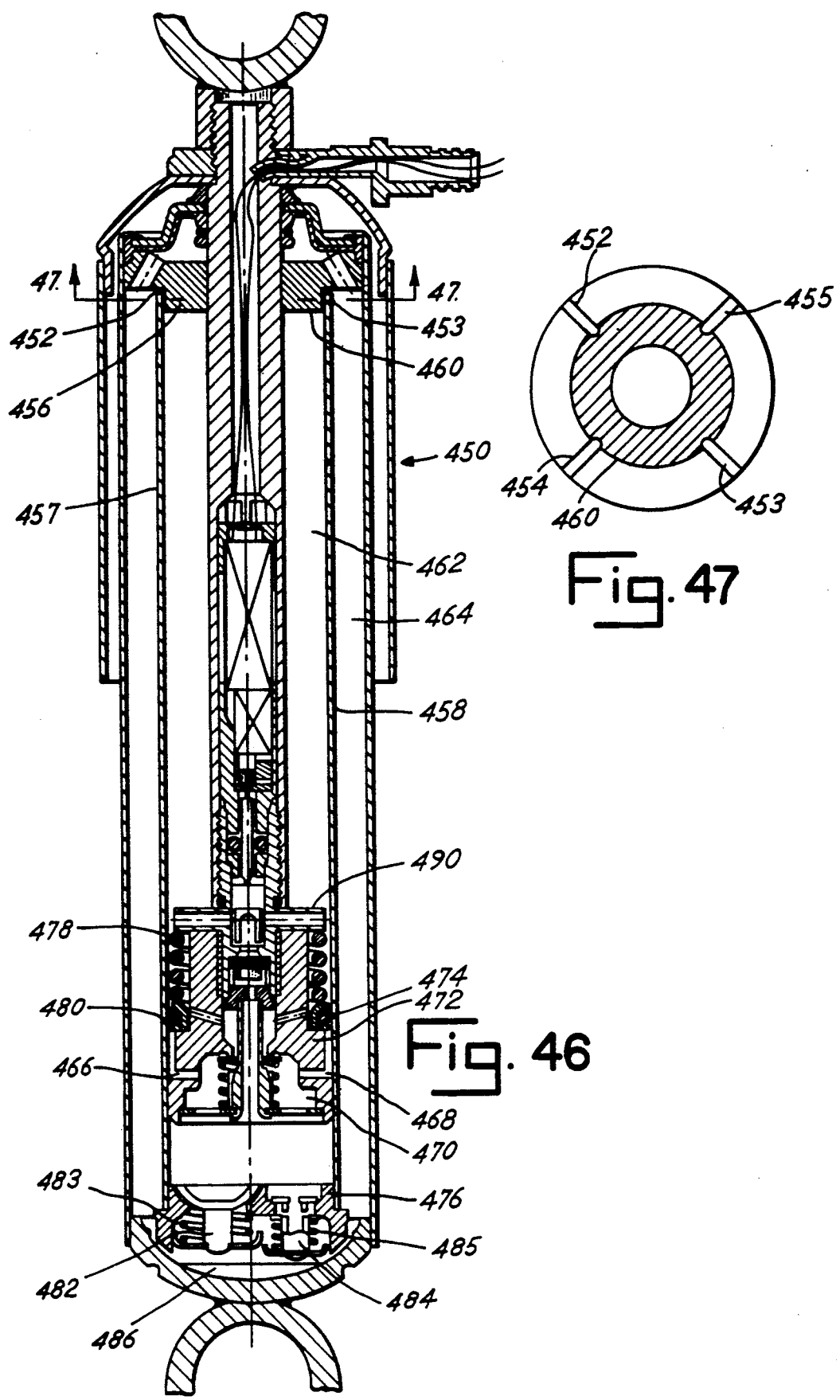

REMOTE CONTROLLED VEHICLE DAMPER

RELATED APPLICATION

This is a continuation-in-part of U.S. patent application, Ser. No. 07/318,619, filed Mar. 3, 1989, now abandoned.

BACKGROUND OF THE INVENTION

This invention relates to dampers, such as shock absorbers or damping struts, for vehicles More particularly, this invention relates to shock absorbers and damping struts in which damping force provided by fluid flow is adjustable either manually or automatically in response to vehicle speed, load, acceleration, or road conditions.

In one typical suspension system for automobiles, shock forces experienced by the suspension system are "absorbed" by a spring and shock absorber combination. The shock absorber consists of a rod and piston mounted within a cylinder, and the spring urges rod to extend outwardly from the outer cylinder Vibrational shock energy within the suspension system is "absorbed" and stored by the compression and extension of the spring. That energy is, in turn, dissipated by the shock absorber or strut during the damping action that results from a valved piston reciprocating within the cylinder containing hydraulic fluid. The damping action converts the vibrational energy to heat which the cylinder wall conducts and transfers to the surrounding atmosphere.

One typical shock absorber has an oil cavity in the cylinder on each side of the rod piston within the cylinder. Compression of the shock absorber (as the spring and piston rod are compressed in response to contact of the wheel with the road) forces oil from one cavity into the other, and rebounding is subsequently damped by the resistance of oil flow in the "reverse direction as the piston is urged toward extension by the rebounding force of the spring. The valving within the piston and between the cavities thus provides the appropriate resistance to fluid flow between the two cavities.

For example, various types of check valves and variable flow restrictions have been developed to allow fluid flow in compression (from the cavity beneath the piston through or around the piston head and into the outer cylinder reservoir cavity) more freely, i.e., with less resistance, than in extension (from the outer reservoir cavity, and from the cavity surrounding the rod into the cavity beneath the piston). Such check valves thus provide greater damping when desired, during extension (rebound), rather than during compression shock absorption, when the shock absorber should compress relatively freely to minimize energy transfer to vehicle occupants.

Improvements on this basic arrangement have provided varying damping characteristics for varying road conditions or vehicle speed, load, or acceleration. As a vehicle goes faster, for example, the damping should often be increased to counteract the increased forces that tend to reduce contact between the tire and the surface of the road.

One such variable damping shock absorber is shown in U.S. Pat. No. 4,527,676 issued Jul. 9, 1985 to Emura et al. The Emura patent discloses a shock absorber with variable damping accomplished by a motor rotating a four-way check valve in the shock. The motor is either (1) a step motor with four steps, one for each of the possible orientations of a four-way check valve, or (2) a feedback-controlled motor, with four arcuate electrical leads contacted by brushes to determine the exact position of the motor drive. Both types of motors are relatively complicated and expensive, as is the four-way valving associated with each.

For example, the Emura device requires a four-wire harness. This results in an expensive and complicated vehicle harness.

Another problem with the Emura device is its relatively complicated and expensive motor mechanism In the embodiment utilizing a four-way step motor, such motors are inherently complicated and expensive because they must be adapted to stop at each of four points, with appropriate electronics to maintain control of the position of the step motor at each of its four stop positions.

In Emura's embodiment utilizing a feedback-controlled motor, the motor provides four-way stepping through a feedback control circuit which receives the feedback from mechanical wipers brushing over electrical contacts. These wipers and contacts wear and corrode over time, causing loss of electrical contact. Emura's variable damping mechanism can thus completely fail long before likely breakdown from any of the remaining components.

SUMMARY OF THE INVENTION

It is an object of the present invention to develop a relatively inexpensive and yet more reliable remote controlled variable vehicle damper.

Another object is to provide such a damper useable with automobile wire harness system that need provides only two wires for use by the variable damping shock absorbers.

A further object is to provide a remote controlled variable damper that does not use brush and contact mechanisms for electrical control of the positioning of valving in the damper.

Yet another object is to provide such a damper with a reliable electrical motor that reliably moves valving between two positions promptly on demand.

An additional object is to provide a variable damper that provides two levels of damping, one of which is optimal for moderate cruising speeds for a vehicle, and another of which is optimal for quick acceleration and deceleration, high speeds, or bumpy terrain. A further object is to provide such a damper that has a reliable, easily switched two-way valve located internally within the shock. Yet another object is to provide as one embodiment such a valve mechanism that converts rotatable motion from a rotating drive pin into linear motion of a slide valve for slidably opening and closing damping fluid flow ports. Another object is to, in the alternative, utilize the rotating motion to drive a rotatable valve.

A yet alternative object of the present invention is to provide a variable damper in which one level of damping is significantly, and preferably very perceptibly, greater than a second level of damping, even at relatively low road impacts.

There are other objects and advantages of the present invention. They will become apparent as this specification proceeds.

BRIEF DESCRIPTION OF THE DRAWING

There are two preferred embodiments of the present invention. They are shown in the accompanying drawings wherein:

FIG. 1 is a vertical cross-sectional view of the first preferred piston rod, having an internal metering pin shown in the upper open position;

FIG. 2 is a vertical cross-sectional view through the center of a motor housing of the first preferred embodiment;

FIG. 3 is a bottom end view of the motor housing of the first preferred embodiment;

FIG. 4 is a side elevational view of the metering pin drive head of the first embodiment of the invention, with a portion broken away to reveal internal detail of the drive head;

FIG. 5 is a top end view of the drive head of FIG. 4;

FIG. 6 is a bottom end view of the drive head of FIG. 4;

FIG. 7 is a vertical cross-sectional view of the metering pin of the first embodiment of the invention;

FIG. 8 is a transverse cross-sectional view of the metering pin of FIG. 7 taken along section line 8—8 in FIG. 7;

FIG. 9 is a vertical cross-sectional view of the first preferred piston rod with the internal metering pin in the lower closed position;

FIG. 10 is a vertical cross-sectional view of a piston stop of the first embodiment;

FIG. 11 is a top end view of the piston stop of the first embodiment;

FIG. 12 is a side elevational view of a compression check pin of the first embodiment;

FIG. 13 is a top end view of the compression check pin of the first embodiment;

FIG. 14 is a side elevational view, partially in section, of a drive screw of the first embodiment;

FIG. 15 is a view of the motor as viewed from the spindle end, taken along section line 15—15 of FIG. 1.

FIG. 16 is a top end view of the drive screw of the first embodiment;

FIG. 17 is a vertical cross-sectional view of the second preferred piston rod, having a bypass tube and a rotary valve in the open position;

FIG. 18 is a plan view of the bottom face of a spacer with rotational stops;

FIG. 19 is a verticle sectional view of the spacer taken along section line 19—19 in FIG. 18;

FIG. 20 is a plan view of the top surface of the spacer;

FIG. 21 is an elevational view of a valve stop;

FIG. 22 is a plan view of the valve stop having a rotation limiting arm;

FIG. 23 is a vertical cross-sectional view of the second preferred piston rod, with the rotary valve in the closed position;

FIG. 24 is a view in elevation of a rotary valve element;

FIG. 25 is another view in elevation taken at 90 degrees to the view of the rotary valve in FIG. 24;

FIG. 26 is a bottom view of the rotary valve element;

FIG. 27 is a top end view of the piston stop of the second preferred piston rod;

FIG. 28 is a sectional elevational view of the piston stop of FIG. 27, taken along section line 28—28;

FIG. 29 is a top end view of the motor housing of the second preferred piston rod;

FIG. 30 is a sectional elevational view of the motor housing of FIG. 29, taken along section line 30—30;

FIG. 31 is a bottom elevational view of the motor housing of FIG. 29;

FIG. 32 is a vertical cross-sectional view of the second preferred piston rod showing the internal components in the piston rod in the environment of a shock absorber;

FIG. 33 is an upper, cross-sectional view, taken along section line 33—33 of FIG. 32, of the strain relief anchor and electrical lead strain relief of the preferred shock absorber;

FIG. 34 is a bottom longitudinal view of the electrical lead strain relief;

FIG. 35 is a side elevational view of the electrical lead strain relief, with the internal wire passageway shown in phantom lines;

FIG. 36 is an upper plan view of the strain relief anchor of the preferred embodiments;

FIG. 46 is a cross-sectional side view of a third embodiment of the shock absorber of the present invention; and FIG. 47 is a cross-sectional view taken along section line 47—47 of FIG. 46, showing the inner cylinder head in the third embodiment of the present invention.

Figure 37:
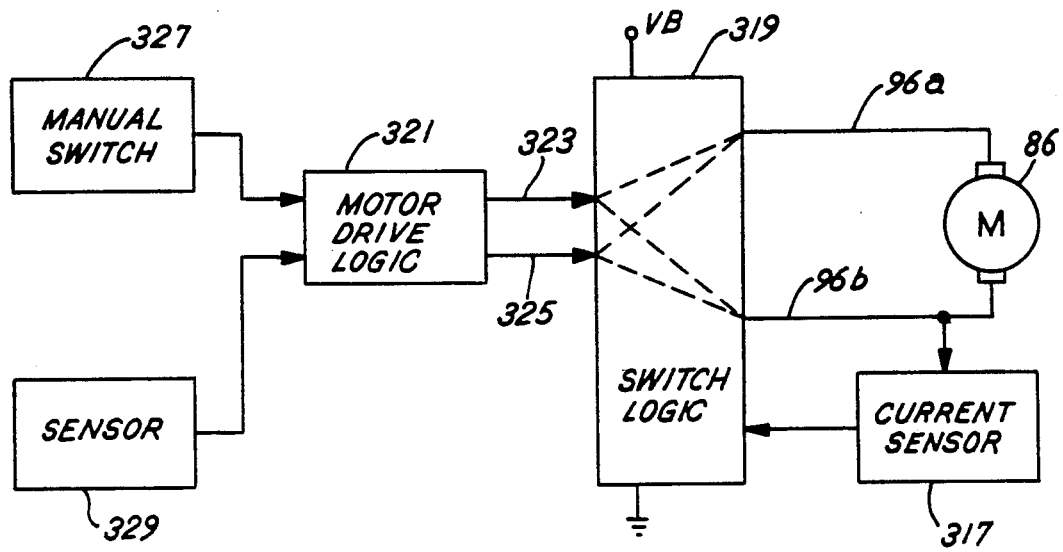
FIG. 37 is a block diagram of a motor control circuitry for the shock absorber employing the piston rod assemblies of FIGS. 1 and 17.

This specification uses various spacially-orienting terms, such as "vertical," "upper," and "lower." These terms are merely for convenience of description of relative location and movement in one orientation of the preferred embodiment. They are not limitations of the many possible orientations of the invention or its components in any given application.

Also, in this specification and claims, the term vehicle damper shall be construed to include shock absorbers, MacPherson struts, and other dampers particularly suited for damping the motion of vehicles.

DETAILED DESCRIPTION OF THE PREFERRED EMBODIMENT

There are three preferred embodiments. The first, generally 10, is shown in FIGS. 1 through 16. The second, generally 12, is depicted in FIG. 17 through 36. The third, generally 450, is shown in FIGS. 46 and 47. The differences between the first 10 and second 12 embodiments are in the internal construction of their respective piston rods 14, 16. The third embodiment 450 has other such differences as well as differences in the surrounding structure in the shock absorber.

With regard to the first embodiment of the piston rod 14 shown in FIG. 1, the piston rod 14 has an upper cylindrical rod 18 secured to a central somewhat cylindrical piston stop 20, which is in turn secured to a piston 21. The piston stop 20 has diametrically opposing, radially outwardly extending flow passages 24, 26; and the piston 21 also has somewhat narrower but also diametrically opposed and radially outwardly extending flow passages 28, 30. The piston 21 has, in addition, lower flow passages, generally 32, at the lowermost end of the piston 21. Valving structure, generally 34, within the piston rod 14 provides selective fluid communication of lower flow passages 32 with opposing piston passages 28, 30 and opposing piston stop passages 24, 26.

Thus, for example, fluid entering through the lower flow passages 32 can be selectively directed toward either the piston flow passages 28, 30 or the combination of piston stop passages 24, 26 and piston passages 28, 30. Moreover, selection of both sets of flow passages, as compared to selection of just one, produces an enlarged flow path, easier flow, and less damping by the piston and rod assembly 14.

As shown in FIG. 10, the piston stop 20 has an internal passage 33 extending through its upper axial length. The internal passage 33 penetrates the axial center of an upper cylinder portion 36 abutting a central planar rim stop 38. An externally threaded lower portion 40 extends axially downwardly from the rim stop 38. The upper cylinder portion 36 has (1) an externally threaded section 42 abutting the rim stop 38, and (2) an internally threaded upper section 44 on the end of the upper cylinder portion 36 opposite the rim stop 38.

As shown in FIG. 11, the planar rim stop 38 has a substantially circular outer periphery 46. As shown in FIG. 10, the opposing piston stop flow passages 24, 26 extend from below the upper planar surface of the rim stop 38 and communicate with axial piston stop passage 33.

The upper portion 48 of the axial passage 33 penetrates the axial center of the rim stop 38 and upper cylinder portion 36, and has a diameter substantially greater than the diameter of the lower portion 50 of the axial passage 33. The junction of the passages 48 and 50 constitutes a truncated conical seat 52 at the lowermost edge of the junction of opposing stop flow passages 24, 26 and the upper axial passage 33. The conical surface of seat 52 is at a 45 degree angle to the axis of the axial passage 33 and to the axis of the coaxial opposing stop flow passages 24, 26.

As shown in FIG. 1, the upper piston rod 18 has an internally threaded lower end 54 threadably secured to the externally threaded section 42 of the upper piston stop cylinder portion 36 shown in FIG. 10. In turn, as shown in FIG. 1, the piston 21 has an upper internally threaded section 56, also referred to as the neck, threadably secured to the externally threaded lower portion 40 of the piston stop 20.

The piston 21 has a radially outwardly spaced skirt 39 extending axially downwardly from the internally threaded section 56. The opposed coaxial piston passages 28, 30 extend radially outwardly from the lower extremity of the threaded section 56. A piston flow passage 60 penetrates the entire axial length of the piston 21. The piston flow passage 60 communicates with a radially narrower passage 77 in the piston end 58. An axially extending neck 66 surrounds the narrower lower passage 77, and terminates at its lower end in a planar and circular valve seat 81, which communicates with a wider lower passage 64. The lowermost end 68 of the wider lower portion 64 of the piston flow passage 60 has a radially outwardly spaced, axially projecting rim 70. The rim 70 has an inner diameter substantially equal to the outer diameter of an apertured retaining plate 73 secured by the rim 70. As shown in FIG. 1, the apertured plate 73 has axial apertures, generally 32, providing fluid communication between the piston flow passage 64 and a volume beyond the end of the piston 21 opposite the piston rod 18 and piston stop 20. The valve structure 34 thus includes a rebound valve cap 79 and rebound valve cap spring 75 retained between the axially extending neck 66, on one end, and the rim 70 and plate 73, on the other.

The rebound valve cap 79 has a conically shaped upper section 74. The upper section 74 of the rebound valve cap 79 has a planar lip 76 extending radially outward to the outermost edge 78 of the upper section 74. The spring 75 biases the rebound valve cap 79 upwardly away from the plate 73 and toward a valve seat 81. The valve seat 81 thus provides a stop by way of contact with the planar lip 76 for upward axial movement of the valve cap 79.

The center of the upper section 74 has a cap passage 80. The cap passage 80 provides fluid communication between the upper passage 60 and the wider lower passage 64 in the piston 21. The valve passage 80 thus also provides for restricted fluid communication between the lower axial apertures 32 in the plate 73 and the piston stop passages 24, 26 and the piston passages 28, 30.

With regard now to the upper portion of the piston rod 18, the internally threaded upper portion 44 of the piston stop 20 threadably mates with the threaded external lowermost end 82 of the motor housing 84 retained within the upper piston rod cylinder 18. The housing 84 and upper piston rod 18 thus cooperatively retain a D.C. motor 86, a gear train housing 88, a spacer 90, a thrust washer 92, and a drive screw 94 within the upper piston rod 18.

The D.C. motor 86 and gear train case 88 are fabricated and assembled as an integral unit and are fixedly retained within the housing 84. The motor 86 and gear case 88 are fixed within housing 84 to prevent relative rotation between the motor 86 and housing 84. The fixation is accomplished by a mechanical keying (not shown) between the motor housing 84 and the gear case 88, or alternatively by the application of an adhesive joining material at the interface between the motor housing 84 and the gear case 88.

Two wires, generally 96, pass through a wire passage 98 in the upper portion of the piston rod 18 above the D.C. motor 86. The wires 96 connect to terminals at the top end of the D.C. motor to provide D.C. current from an external source, through the wire passage 98, to the D.C. motor 86.

Referring now to FIG. 2, the housing 84 has four coaxial passages 100, 102, 104, 106. The uppermost passage is a motor and gear train retaining passage 100, which adjoins the narrower intermediate area 102, which in turn adjoins the still narrower drive screw guide passage 104, which in turn adjoins a rectangular pin slide passage 106.

The housing 84 also has a seal groove 108 penetrating its outer periphery 110. The portion of the housing's outer periphery 110 on each side of the groove 108 has an outer diameter slightly less than the internal diameter of the upper piston rod 18. With a seal 112 in the seal groove 108, as shown in FIG. 1, the housing 84 thus sealingly slides easily into the upper piston rod 18 during assembly or out of the piston rod 18 for repair if necessary.

With continuing reference now to FIG. 1, a gear-driven spindle 114 extends from the gear train downwardly: (1) through the gear case cup-shaped support 115; (2) then through the thrust washer 92 abutting the lowermost side of the gear case support 115; and (3) into a spindle passage 116 in the drive screw 94, also shown in FIGS. 14 and 16. The thrust washer 92, support 115, and spacer 90 are slidably secured within the gear train retaining area 102 of the motor housing 84. Consequently, axial loads generated by operation of the drive screw 94 or by unbalanced hydraulic forces acting on the rim section 120 of the drive screw 94, are transmitted through the washer 92 and the spacer 90 into (i) the gear case support 115, and (ii) the gear case 88, rather than from the motor spindle 114 into the gears within the gear case 88.

Referring now to FIG. 14, the drive screw 94 has: (1) an upper head 118, with the slot-like pin passage 116 penetrating the head 118 along the axis of, but offset radially from, (2) an intermediate cylindrical rim section 120 extending axially downwardly from the head 118; and (3) an externally threaded metering pin drive end 122 extending axially downwardly from the rim section 120. The head 118 is bounded at its upper end by a vertical cylindrical wall 119 terminating in a radially outwardly projecting shoulder 124. The shoulder 124 thus extends radially outwardly to form a generally axially extending circular boss 125. The shoulder 124 and boss 125 provide axial support for, and cooperate with, the lower surface, on the thrust washer 92.

Referring to FIG. 15, the gear driven spindle 114 has an axis of rotation coincident with the axis A of the D.C. motor 86 and gear case 88. The spindle 114 has: (1) an axially extending, generally cylindrical surface 121 spaced radially from the axis of rotation; and (2) a flatted axially extending spindle surface 117 on the lower extent of the spindle surface 121. As shown in FIGS. 14 and 16, the width of the slot 116 in the screw head 118 is slightly larger than the cross-sectional dimension w' of the spindle 114 as shown in FIG. 15. The flatted surface 117 mates with a reciprocally flatted surface in the slot 116 and transmits the torsional force of the spindle 114 to the drive screw 94.

Referring now to FIG. 1, the cylindrical rim section 120 of the drive screw 94 is retained in an axially rotatable position by the thrust washer 92 and drive screw passage 104. In this manner, the threaded end 122 of the screw 94 can threadably engage, and rotate with respect to, the reciprocally internally threaded passage 130 in the metering pin slide 126, also shown in FIGS. 4 through 6.

With reference to FIG. 3, the metering pin slide passage 106 of the motor housing 84 has a square cross-sectional periphery. Referring to FIGS. 4 and 5, the metering pin slide 126 has a slightly smaller but also square cross-sectional upper external periphery 128, to axially slide within slide passage 106. This prevents relative angular rotation between metering pin slide 126 and motor housing 84 of FIG. 2.

Referring now to FIG. 1, when the drive screw 94 is retained in position in the drive screw passage 104, rotation of the drive screw 94 in one direction drives the slide 126 axially and outwardly of the slide passage 106. Rotation of drive screw 94 in the opposite direction will retract the slide 126 axially and inwardly of the slide passage 106.

Referring now to FIG. 4, the slide 126 also has an externally threaded lower end 132. This lower end 132 has threads adapted to mate with, as shown in FIG. 1, an internally threaded upper end 134 on the metering pin 136 shown in FIGS. 7 and 8.

With reference to FIG. 7, the metering pin 136 has a cylindrical intermediate section 138 extending downwardly from the threaded upper end 134 and terminating at its lowermost end in an external shoulder 142. A narrower cylindrical regulating pin 140 extends downwardly from the shoulder 142. A passageway 151 extends the entire axial length of the pin 140. The passageway has: (1) an enlarged upper portion extending substantially the entire axial length of the intermediate section 138; (2) a narrower lower portion extending substantially the entire axial length of the regulation pin 140; and (3) a radially inwardly extending internal neck 150 intermediate and adjoining the upper and lower portions 138, 140.

The external conical shoulder 142 constitutes a truncated conical peripheral surface 142 at a 45 degree angle to the axis of the regulating pin section 140. As shown in FIG. 9, the conical peripheral surface 142 cooperatively mates with, and sealingly engages, a reciprocally angled seat 52 in the piston stop axial passage 33, also shown in FIG. 10.

Referring back to FIG. 1, a compression valve pin 156 slidably penetrates the axial length of the metering pin passageway 151. As shown in FIG. 12, the valve pin 156 has an upper flanged end 159, a lower conical end 160, and a somewhat cylindrical central section 162 intermediate the two ends 158, 160. The central section 162 has a midsection 164 of somewhat narrowed cross-section to reduce the potential for resistance to axial movement of pin 156 within, as shown in FIG. 1, the metering pin passageway 151.

Still referring to FIG. 1, the upper flanged end 159 of the valve pin 156 is retained within the internal upper axial passageway 154 of the metering pin 136. A valve pin spring 166 urges downwardly the flanged end 159 of the valve pin 156 to abut the internal shoulder or neck 150 in the upper passageway 154 of the metering pin 136. The outer radial periphery of the flanged end 159 is slightly smaller than the internal diameter of the axial passageway 154 so that the flanged end 159 can slide axially in the passageway 154.

The valve pin spring 166 also has an outer diameter somewhat less than the inner diameter of the passageway 154. The spring 166 has an upper end (not shown) abutting a radially inwardly extending shoulder 168, as shown in FIG. 4, in the internal passage 130 of the slide 126, which is also shown in FIG. 1. The spring 166 has a lower end 170 abutting the upper radial surface of the flange 159 of the compression valve pin 156, biasing the flanged end 158 to abut the shoulder 150 of the metering pin 136.

Referring again to FIGS. 7 and 8, the intermediate section 138 of the metering pin 136 has intersecting cross flow passages 144, 146 perpendicular to the axis of the metering pin 136. The passages 144, 146 intersect within the upper passageway portion 154 in the regulating pin 140, providing a fluid vent for the passageway portion 154. Venting of the cavity 154 via passages 144 and 146 facilitates the flow of fluid into and out of the cavity 154, which accommodates the change of cavity volume as the end portion 158 of the valve pin 156 moves alternatively into and out of the cavity 154.

As shown in FIG. 1, the central cylindrical section 162 of the valve pin 156 is somewhat longer than the cylindrical regulating pin 140. Thus, as shown in FIG. 9, the conical end 160 of the valve pin 156 extends downwardly well through the rebound valve cap passage 80 of the rebound valve cap 79 when: (i) the metering pin conical surface 142 abuts the conical seat 52 in the piston stop 20, and (ii) the upper flange end 159 of the valve metering pin 136 abuts the internal neck 150 in the metering pin 136. As shown in FIG. 1, however, the conical end 160 of the valve pin 156 barely penetrates the rebound valve passage 80 when: (i) the internally threaded upper end 134 of the metering pin 136 is retracted from conical neck 52 as far as possible, and (ii) the under surface of flange 159 of the valve pin 156 abuts the internal neck 150 in the metering pin 136.

In the preferred embodiment of FIGS. 1 and 9, the metering pin 136 and compression valve pin 156 are selectively positioned in piston stop axial passage 33 by selective activation of the motor 86. Energization of the motor to rotate the gear drive spindle 114 forces the external threads on the drive end 122 of the drive screw 94 to rotate within the non-rotating internal threads 130 on the slide 126. Since the drive screw 94 is retained in its same axial location relative to the motor housing 84 and piston rod 14, the rotating threads on the drive end 122 force the slide 126 and metering pin 136 with compression valve pin 156 to move axially in the metering pin slide passage 106 of the motor housing 84. Depending on the orientation of the threads, rotation of the gear driven spindle 114 in one direction drives the slide 126 and the assembled meeting pin 136 in one axial direction, and rotation of the spindle 114 in the opposite direction drives the slide 126 and the assemble metering pin 136 in the opposite axial direction.

In operation during the compression stroke of the piston 21, fluid flows: (i) upwardly through the lower flow passages 32 in the piston plate 73; (ii) into the piston cavity 64; (iii) through the rebound valve passage 80; (iv) into the passage 60 in the piston; (v) out of the piston 21 through passages 28, 30; and (vi) into the rebound chamber (not shown in FIGS. 1 or 9). With the metering pin 136 retracted upwardly as shown in FIG. 1 to space the angled periphery 142 on the pin 136 from the angled seat 52 of piston stop 20, fluid also flows; (i) upwardly through the axial passage 51 bounded by the outer surface of the regulating pin 140 and the inner surface of the lower portion 50 of axial passage 48 in the piston stop 20; and (ii) out the piston stop passages 24, 26. In addition, if the pressure of the fluid passing upwards through compression valve passage 80 is great enough to overcome the downward force of compression valve spring 166 against the compression valve pin 156, the fluid force pushes the conical end 160 of the compression valve pin 156 into stem 140 of the metering pin 136, away from the compression valve passage 80. This upward movement of the compression valve pin 156 away from the valve passage 80 allows greater fluid flow through the valve passage 80 due to reduced blockage by the conical end 160. The compression valve pin 156 thus serves to reduce fluid restriction and damping when the piston rod assembly 10 moves downwardly during the compression portion of the shock absorber stroke.

When, as shown in FIG. 9, the metering pin 136 is driven downwardly in the axial passage 48 of the piston stop 20 to abut the angled seat 52, the metering pin's angled peripheral portion 142 seals the upper portion of the passage 50 and passages 24, 26 from fluid communication with the lower portion of the axial passage 50. In this downward sealing position, the end portion 153 of metering pin cylinder 140 is closely spaced above the rebound valve passage 80, and the valve pin 156 penetrates the passage 80 to further restrict fluid flow through the passage 80.

In operation during rebound or extension of the shock absorber, fluid flows into the piston flow passages 28, 30. With the metering pin 136 in the "up" or "open" position (spaced from the angled seat 52), fluid also flows inwardly through passages 24, 26. The fluid then flows downwardly through the rebound valve cap passage 80 to the extent not blocked by the compression valve pin 156 and metering pin 136. If the extension forces are great, fluid pressure against the rebound valve cap 79 forces the valve 79 to move downwardly against the opposing force of valve spring 75. Fluid then flows past the gap created between the valve cap 79 and the rebound valve seat 81, and then to and through the lower flow passages 32.

Referring now to FIGS. 17 and 23, the applicants' alternative and most preferred embodiment does not utilize relative axial movement between a metering pin and stop flow passages 24, 26 to modify the fluid flow and damping characteristics as shown in FIGS. 1 and 9. Instead, in the embodiment of FIGS. 17 and 23, the gear drive spindle 239 rotates an internal rotary valve 172 extending axially downwardly from a drive rod 232 to modify the fluid flow path and as a consequence the damping forces.

The rotary valve 172 is shown in detail in FIGS. 24 through 26. Legs 176 extend axially downwardly from a cylindrical body section 177 of the valve 172. The legs 176 are integral with and extend from diametrically opposite sides of the body section 177 and are joined at their inner extent by the arcuate section 178. The outer peripheral arcuate surfaces 179 of the legs 176 are concentric and coincident with the body section's cylindrical surface 180, which is interrupted in part by a slot 181. External surfaces 179 and 177 of the rotatable valve 172 rotatably cooperate with, as shown in FIG. 17, the internal cylindrical surface of the bore 184 in the piston stop 185. The legs 176 valve the radial fluid flow paths 186 and 187 between a full flow condition and a near zero flow condition.

The full flow condition prevails when the valve 172 is rotated so that axis A of the radial flow paths 186, 187, is parallel with axis B of the arcuate surface 178 of the valve 172. The near zero flow condition prevails when, as shown in FIG. 23, the valve 172 is rotated so that the above referenced axes A, B are perpendicular to one another, resulting in the arcuate surface 179 of the lugs 176 blocking the flow passages 186 and 187.

A spring-loaded compression orifice valve 190 is biased toward the retaining cap 196 within the bore 189 of the piston stop 185. The orifice valve 190 has a valve spring 191 extending upwardly from a radially outwardly extending flange seat 192 formed on the apertured orifice valve 190. The lower end of the valve spring 191 abuts and urges the orifice valve 190 downwardly in the lower axial passage 64 in the piston stop 185.

As shown in FIG. 17, the orifice valve 190 is thus urged into contact with the upper end of an orifice valve retaining cap 196. The cap 196 has a central flow restricting passage 198 and a downwardly and radially extending flange 200, the internal diameter of which is only slightly larger than the outer diameter of an axial bypass tube 194, which extends downwardly through the piston lower axial passage 64. The lowermost end of the bypass tube 194 has a radially extending shoulder 201 and an axially projecting cylinder end 202 extending downwardly from the lowermost portion of the shoulder 201. The cylinder end 202 extends downwardly through a center hole 205 in the rebound valve retaining plate 173. The bypass tube shoulder 207 thus abuts the upper surface of the retaining plate 173, and an axial bypass flow passage 204 extending through the bypass tube 194 provides fluid communication between the lowermost end of the piston 22 and the compression orifice valve 190.

Surrounding the lower end of the axial bypass tube 194 is a rebound valve spring 206. The bottom end of the spring 206 abuts the upper surface of the valve retaining plate 173, and the upper end of the spring 206 abuts the lower surface of the rebound valve cap 208. The rebound valve cap 208 has a central aperture 210 slidably receiving bypass tube 194. The spring 206 urges the upper surface of rebound valve cap 208 to abut the lowermost surface 81 of the rebound valve seat projection 66 in the axial passage 64.

As shown in FIGS. 18 through 20, a spacer 212 having a cylindrical wall surface 211 and a flatted wall portion 213 interrupting the surface 211, resides within, as shown in FIG. 17, the motor housing 218 to abut and support the gear case shoulder 219. The end surface 215 on the spacer 212 abuts the shoulder surface 219 on the gear case 237. The opposite end surface 217 of the spacer 212 is axially, downwardly spaced from the lower end wall surface of the motor/gear case 237. As shown in FIG. 18, the pads 222 adjacent the stop faces 209 of the spacer 212 serve as resilient contacts for the arm 203 of the rotatable limit arm 228 on the valve stop 223 shown in FIG. 22.

As shown in FIGS. 17 and 22, a valve stop 223 is symmetrical about the axis 225. The cross-section configuration of a central bore 226 in the stop 223 is similar to that of, as shown in FIG. 17, the motor spindle 239. The spindle 239 is slightly smaller in cross section than the bore 226 and thus slidably penetrates the axis of the bore 226

As shown in FIG. 17, a thrust washer 224 is retained within a semi-circular recess 207 in the spacer 212.

Referring now to FIG. 19, the spacer recess 207 has a planar bearing surface 217 spaced axially inwardly of, and parallel to, the end surface 215. As shown in FIG. 17, the thrust washer 224 surrounds the motor spindle 239, and separates the valve stop surface 229 and the spacer surface 217, to provide an antifriction element between the two surfaces 229 and 217.

The driven spindle 239 extending from the gear train is partially contained within the case 237 and has a generally rectangular cross section corresponding to that of central bore 226 of valve stop 223 of FIG. 22. The spindle 239 extends outwardly of and downwardly from the gear case 237 through the close-fitting bore 226 in the valve stop 223. The spindle 239 thus partially penetrates the transverse axially extending slot and counter bore 231 of spacer 212 as shown in FIGS. 17 and 19. The valve stop 223, residing in the recess 207 of the spacer 212, rotates with, and is driven by, the spindle 239 as is the drive rod 232 powered by the rotation of the DC motor 86.

In operation, the rotational force of the motor 86 continues until the radial arm 203 of the valve stop 223 contacts one of the elastomer pads 222. At the instant of contact between the resilient pad 222 and the arm 203, the rotational inertia of the rotor of the motor 86 is gradually absorbed by the resistance associated with the compliant elastomer pad 222. Shock and impact that would otherwise occur by instantaneously stopping the rotor's angular velocity would induce extremely high stresses and cause physical damage to the gear train. This in turn would greatly diminish the effective life time of the motor gears. The electrical circuitry associated with the control of motor 86 is such that the resistance to rotation experienced by the rotor at the time the pads 222 contact the arm 203 is sensed and the delivery of electrical power to the motor is discontinued, leaving the rotary valve 172 in a preselected angular relation relative to the radial flow paths 186 and 187 of the piston stop 185.

The spacer 212 and motor 86 are cylindrical with a single axially extending flatted surface portion such as that shown as the flatted surface 213 for the spacer 212 in FIGS. 18 and 19. Referring to FIGS. 29 through 31, which illustrate the motor housing 218, the housing 218 has an upper internal wall 267, which is cylindrical in cross section and slightly larger in diameter than the outside diameter of the motor 86 and gear case 237, allowing for a slip fit of the motor 86 and gear case 237 within motor housing 218. A radially inwardly and downwardly sloping surface 268 is intermediate the fully cylindrical surface 267 and a partially flatted axially extending cylindrical surface 269. As shown in FIG. 17, the spacer 212, motor 86, and gear case 237 are axially and slidable received within the two piece motor housing 218. The adjacent internal and external flatted surfaces of the motor housing 218, spacer 212, and motor gear case 237 prevent relative angular motion from occurring between the three components: the motor housing 218, spacer 212 and case 237.

As shown in FIGS. 27 and 28, the piston stop 185 has two opposing and axially upwardly extending lugs 270 protruding a distance beyond the otherwise horizontal end surface 271 of piston stop 185. The lugs 270 each have diametrically opposed, planar, axially extending surfaces 272.

As shown in FIGS. 30 and 31, a lower protruding boss 273 on the motor housing 218 has diametrically opposing, axially extending flats 282. The boss, with flats 282, when assembled with the piston stop 185 has shown in FIG. 17, is slidably received between, the projecting lugs 270 of the piston stop 185. In this manner and as shown in FIG. 17, the torsion reaction forces from the powered motor 86 and drive rod 232 and the rotary valve 172 are transmitted through the threaded engagement of the piston stop 185 into the piston rod 16. The slot 231 of the drive rod 232 has an axial depth that precludes bottoming of the lowermost end portion of the motor spindle 239 within the bottom of slot 231. This prevents axial loading of the motor spindle 239 and the associated gear train.

A midsection 235 of the drive rod 232 extends axially downwardly through bearing bore 242 of a bushing 243 integral with the tang end 236. An elastomeric sealing member 241 sealingly surrounds the cylindrical midsection 235 of the drive rod 232 and sealingly engages the surface 183 of the axial passage of the piston stop 185. This sealing engagement prevents fluid leakage axially upwardly through the axial bore of piston stop 185.

The tang end 236 slidably penetrates and abuts a transverse axially extending slot 181 in the upper end of the rotary valve 172 as shown in FIG. 17. The axial motion of the valve 172 is rotatably restrained within the bore 184 of the piston stop 185 by the bottom annular surface of the bushing 243 and by a shoulder 188. The shoulder 188 extends radially inwardly from the cylindrical bore 184 of the piston stop 185, abutting the lower surface of the valve legs 176. The axial slot 181 of the valve 172 has an axial length sufficient to prevent bottoming of the axially projecting tang end 236 within the slot 181.

Referring again to FIG. 17, during the compression stroke, the second embodiment's fluid flows: (i) into the open lower end of the bypass tube 194; and (ii) if the rotary valve 172 is in the "open" position as shown in FIG. 17, (a) through the central flow passage 198 of the retaining cap 196, (b) through the orifices in the compression orifice valve 190, (c) through the shouldered bore 276 of the piston stop 185, (d) into the arcuate passage formed by the legs 176 of rotary valve 172, and (e) radially outwardly through the radial flow passages 186, 187 of the piston stop 185. Of course, the latter flow paths 186, 187 are shut off when the rotary valve 172 is rotated into the "closed" position, as in FIG. 23.

During extension of the FIG. 17 embodiment with the rotary valve 172 "open," fluid flows: (i) into the stop passages 186, 187; (ii) down through the orifices in the seated compression valve 190; (iii) through the central flow passage 198 of the retaining cap 196; and (iv) out the bypass flow passage 204. Additional fluid flows through a parallel passage in the valve area surrounding the bypass tube 194. This fluid flows through the parallel path to the radial flow passages 28, 30 of the piston 22 and downwardly through the piston passage 77. At a predetermined piston velocity, the hydraulic pressure against the upper surface of the rebound valve cap 208 forces the valve cap 208 downwardly against the resisting force of spring 206. The fluid then flows through the open valve and out the lower flow passages 32.

Closing the rotary valve 172 as shown in FIG. 23 during extension stops fluid flow through the bypass tube 194. The closure thus increases damping forces in extension, and to a lesser degree in compression as well.

Referring now to FIG. 32, the embodiment of FIG. 23 is shown in the environment of an automotive shock absorber. The piston is mounted within a sealed intermediate cylinder 221, with the upper piston rod 16 slidably penetrating a seal 220 on the upper end of the cylinder 221. The upper end 244 of the piston rod 16 is externally threaded, and a mounting eye adaptor 245 is threaded on, or otherwise attached to, the upper end 244.

A circular cylindrical section 246 of the piston rod 16 extends immediately below the threaded end 244. The cylindrical section 246 terminates in a radially extending shoulder 247 extending radially outwardly from the cylindrical section 246. A dust tube cap 248 abuts the shoulder 247.

A radially extending vertical slot 234 penetrates (i) the outer surface of the upper threaded end 244, and (ii) the cylindrical section 246, to communicate with the wire passage 98 in the piston rod 16 and accept the inwardly extending tang 255 on the cap 240 as shown in FIG. 36. An angled nose 249 of an electrical lead strain relief 238 penetrates the vertical slot 234 to provide a protective passage for the wires 99 through a central wire passway 250 extending through the length of the strain relief 238.

The strain relief 238 is secured in place in the vertical slot 234 by the anchor cap 240. The anchor cap's lower surface abuts the upper surface of the dust cap 248, and the anchor cap's upper surface abuts the bottom surface of the mounting eye adaptor 245. As shown in FIGS. 34 and 35, the strain relief 238 has a midsection 216 shaped to conform to the upper surface of the dust cap 248 and lockingly abut the lower surface of the anchor 240. The strain relief 238 therefore cannot rotate with respect to the piston rod 16 or mounting eye adapter 245.

As shown in FIG. 32, the inner cylinder 254 has an upper cavity 252 and a lower cavity 253, with the piston 22 separating the two cavities 252, 253. Oil from the lower cavity 253 must flow into a reservoir cavity 261 through a base valve system 257 in order to move the piston rod 12 downward in compression. Similarly, oil must flow in the opposite direction for movement of the piston rod 12 upward in extension.

The flow of fluid through the remote controlled fluid passages has been described herein As shown in FIG. 32, however, fluid can also pass from one cavity to another during compression by flowing between the inner surface of the inner cylinder wall 254 and the outer circumferential periphery of the piston 22. A spring loaded piston seal assembly 256 limits the volume of fluid flow in this manner. The piston bypass seal assembly 256 has an angled metal upper ring or carrier 258, a planar metal lower ring or protector 260, and a sealing ring 262 sandwiched between, and extending radially outwardly from, the carrier and protector rings 258, 260. The sealing ring 262 thus sealingly and slidingly engages the inner wall of the inner cylinder 254. The lower edge of the verticle wall portion of the carrier 258 is urged into engagement with the radially extending surface 264 of the piston 22 by a compression by-pass spring 266. The upper end of the piston by-pass spring 266 abuts the lower radially extending surface of the piston stop 185, while the bottom 286 of the spring 266 bears against the upper surface of the carrier 258 to axially compress the seal 262 and bias the lower surface of the protector 260 against the radially extending surface 264 of the piston 22.

The piston bypass seal 256 provides an additional mechanism for varying resistance to movement of the piston 22 during a compression stroke. Fluid pressure against the lowermost surface of the protector 260 urges the seal 262 against the horizontally extending surface of the carrier ring 258, thereby compressing the seal 262 and permitting the protector 260 to move vertically and uncover the small slots 280 coined into the lower edge of the vertical leg of the carrier 258. The slots 280 provide a restricted fluid communication permitting fluid to flow from the chamber 253 beneath the piston to the chamber 252 above the piston during the compression stroke of the shock absorber. At a predetermined piston velocity, the fluid force overcomes the preload of the spring 266, moving the protector 260, the seal 262, and the carrier ring 258 vertically away from the radially extending surface 264 and thus permitting increased fluid flow upwardly between the verticle leg of the angle ring 258 and the outer upper surface 290 of piston 22, and then into chamber 252. This permits movement of the rod 16 in compression as fluid moves not only through the adjustable valving as described previously but also past the outer periphery of the piston 22 in the vicinity of the piston bypass seal assembly 256.

A two-way compression base valve assembly 257 is secured adjacent the lower end of the inner cylinder 254. When compression forces are sufficiently high on the piston 22, the compression valve 259 opens against the upward biasing force of compression valve spring 274 to allow fluid flow from the lower chamber 253 into base chamber 278 and the reservoir 261 between the outer surface of the inner cylinder 254 and the inner surface of the intermediate cylinder 221. This provides fluid flow into and out of the base chamber 278 and, in turn, into or out of an oil reservoir chamber 261. The inner cylinder head 19 secures the upper piston rod 16 slidably in the intermediate cylinder 221. The piston rod seal 220 provides a dynamic seal with the piston rod 16 and a static seal with intermediate cylinder head 251.

Referring now to FIGS. 46 and 47, the third alternative embodiment, generally 450, is the applicants' most preferred embodiment This embodiment 450 provides for a greater disparity between the two levels of damping, soft and firm, at relatively low road inputs to the damper 450 With this embodiment 450, a person riding in the vehicle can perceive a relatively greater disparity between the two levels of damping, soft and firm, even on a smooth road at cruising speeds in a conventional automobile.

Referring now to FIGS. 46 and 47, this variable damper 450 has upper fluid slots 452, 453, 454, 455 (454 and 455 not shown in FIG. 46) in the cylinder cap 456, which seals the uppermost end 457 of the inner cylinder wall 458. As shown in FIG. 47, the four upper fluid slots 452, 453, 454, 455 extend radially outwardly from the cap radial edge 460 to provide a flow path for, as shown in FIG. 46, damping fluid between the internal chamber 462 within the inner cylinder wall 458 and the external chamber 464 surrounding the inner cylinder wall 458.

The third embodiment 450 also has a plurality of piston fluid passages 466, 468 extending radially outwardly from the wider lower passage 470 in the piston 472 to the periphery of the piston intermediate the piston seal 474 and the lower end of the piston 472. The fluid passages 466, 468 provide an additional path for fluid flow between the wider lower passage 470 in the piston 472 and the inner chamber 462 when pressure of fluid from the wider lower passage 470 against the piston seal 474 during compression is sufficiently large to compress the seal spring 478 and force the seal 474 away from the radially extending seal surface 480.

The third embodiment 450 also has, a compression head 476 secured to the lowermost end portion of the inner wall 457. The compression head 476 has a first valve 482 and a second valve 484. The first valve 482 allows fluid to flow from the lowermost fluid cavity 486 in the shock 450 into the chamber above the compression head 476 and beneath the piston 472 when the fluid pressure within chamber 486 on extension of the shock absorber 450 is sufficient to lift valve 482 compressing the first valve spring 483. The second valve 484 permits fluid to flow to the lowermost fluid cavity 486 from the chamber above and adjacent the compression head 476 when the fluid pressure above the compression head 476 is sufficient to compress the second valve spring 485.

This third embodiment 450 thus provides additional flow paths when the compression and extension forces, and associated fluid pressures, become sufficiently great to compress the respective valves and associated springs. These additional flows paths provide greater responsiveness for the shock when the extension or compression forces are sufficiently great.

At the same time, the variable damping mechanism, generally 490, controls addition fluid valving and flow passages within the piston during compression and extension. In conjunction with the additional flow paths provided by the additional structure of this embodiment 450, the two levels of damping provided by the mechanism 490 are much more noticeably different, especially at low road speeds and low amplitude inputs to the shock absorber 450. This greatly enhances the utility of the shock absorber 450 to the user, providing a distinct firm or soft ride as desired under a relatively wide range of road surfaces and vehicle speeds.

Figure 38A:
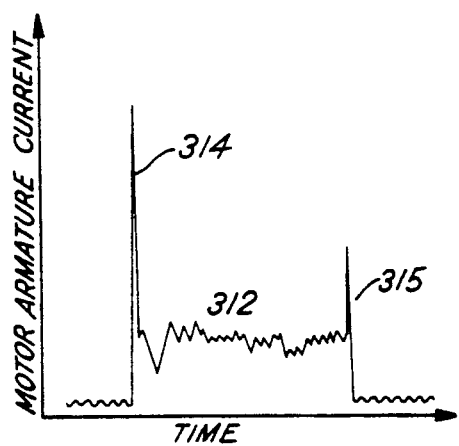
FIGS. 38a and 38b are electrical waveform diagrams of the motor current of the motor of the shock absorber employing the piston rod of FIG. 1 and 17.

Referring now to FIG. 37 and 38a, the motor 86 is a direct current motor which rotates in both a forward direction and a reverse direction for driving metering pin 136, as shown in FIG. 1, in an axial direction for seating and unseating of the angled periphery 142 onto and off of an angled stop neck 52. When angled periphery 142 seats against the angled stop neck 52, the motor armature is prevented from further rotation. This causes an electrical spike 315 (FIG. 38a) to be developed in the current powering the motor. A current spike 315 is also generated when the slide 126 is driven upwardly to its fullest extent and the cylindrical flange portion 127 (FIG. 4) seats against the bottom annular surface 105 (FIG. 2) of the motor housing 84.

As shown in FIG. 37, a current sensor 317 senses current spike 315 and generates a signal to a switch logic 319. In response, the switch logic 319 interrupts the electrical current supplied to the motor. Current is supplied to the motor 86 by two conductors 96a, 96b. When the conductor 96a is positive with respect to conductor 96b, the motor 86 is driven clockwise. When the conductor 96b is positive with respect to the conductor 96a, the motor 86 is driven counterclockwise.

A motor drive logic 321 supplies control voltages to the switch logic 319 along a pair of conductors 323, 325. The logic 319 is responsive to the control signal on the conductor 323 for determining the motor's direction of rotation The logic 319 is responsive to the control signal on the conductor 325 for initiating TURN ON and TURN OFF of the motor. The switch logic 319 switches the effective connection of the conductors 96a or 96b with an input voltage VB and with a ground connection.

A manual switch 327 is operable by the vehicle operator for switching the direction of rotation of the motor and for driving metering pin 136 to its opposite seated position, upon which the motor stops. Upon actuation of the switch 327, the motor drive logic 321 places a voltage onto the conductors 323, 325. The metering pin drive motor current may be switched manually by the vehicle operator or may be controlled automatically by signals generated by remote sensors of, for example, vehicle speed, load, acceleration or a combination of these parameters, as represented by the sensor 329.

As will suggest itself, the motor 86 may be replaced a stepping motor or by a rotation counter and controller to provide a plurality of valve positions from full open to full closed.

Figure 39:
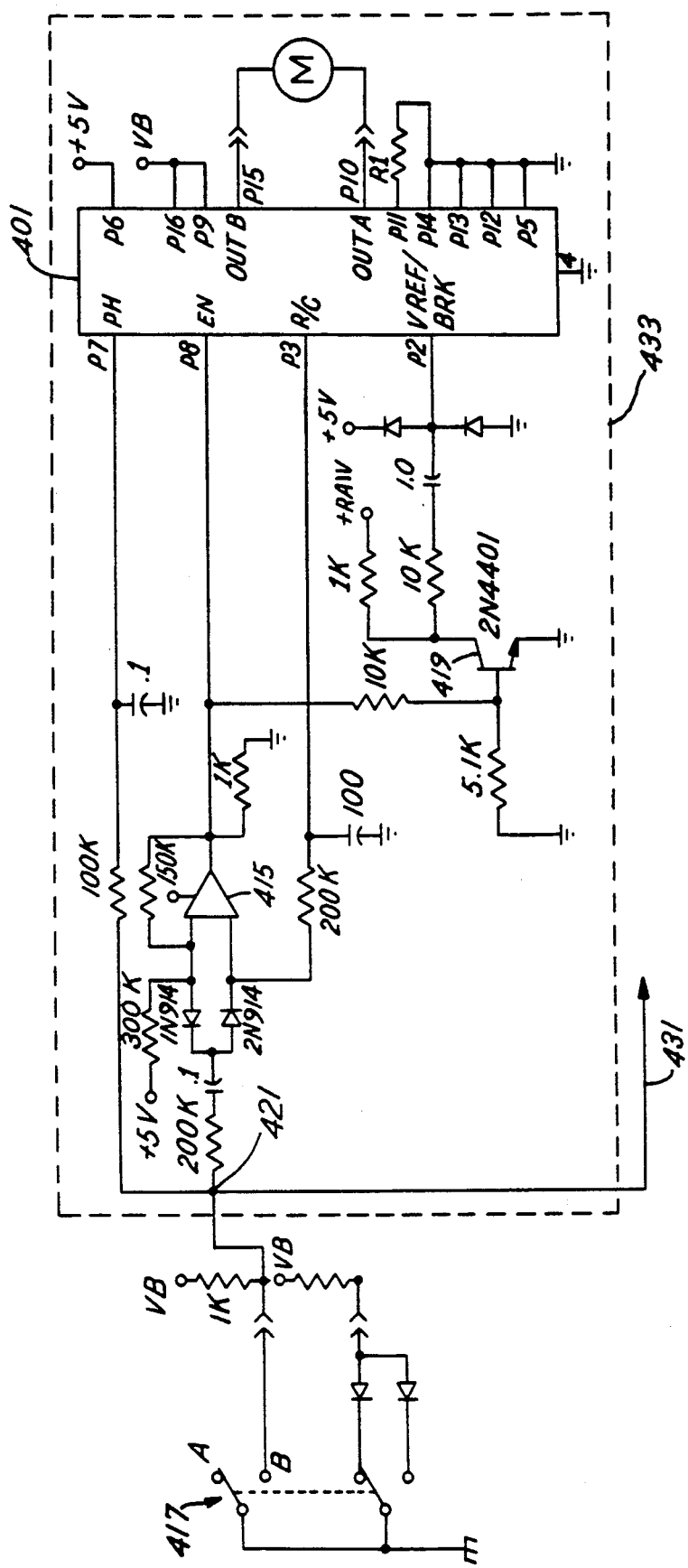
FIG. 39 is an electrical schematic diagram of a motor control circuitry for the shock absorber employing the piston rod of FIGS. 1 and 17.

Referring to FIG. 39, a first embodiment of the control circuitry is shown. A conventional integrated circuit chip 401 (manufactured by Sprague Electrical Company as chip UDN 2953B) controls the direction of current flow to the motor 86. The chip 401 is a conventional current/voltage control chip 401 having current- /voltage entering pins P9, P16, current/voltage exiting pins P10, P15, direction control pin P7, ON/OFF pin P8, and controlling pins P2, P3, P11.

The chip 401 is supplied with logic voltage and is grounded in a conventional way. Pin P6 of the chip 401 receives a logic voltage supply of 5 volts in order to control the logic gates within the chip; and pins P4, P5, P12, P13, P14 are connected to ground.

Pins P9, P16 of the chip 401 receive the motor supply voltage VB which is connected by internal power transistors to either output A (pin P10) or output B (pin P15) in order to drive the motor 86. The PH or phase line pin P7 determines whether the motor supply voltage is fed from output A to output B or from output B to output A. For example, setting the PH line HIGH causes the motor 86 to turn in one direction, and setting the PH line LOW causes the motor 86 to turn in the opposition direction.

Figure 40:
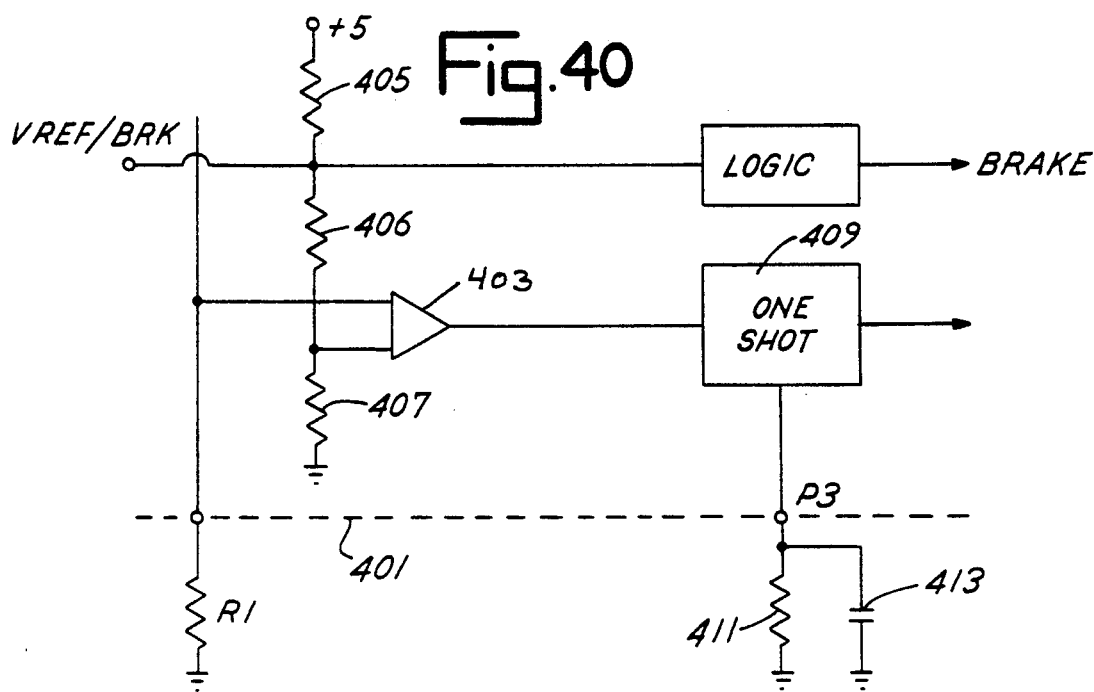
FIG. 40 is an electrical schematic/block diagram of a portion of the circuitry of FIG. 39.

A register R1 is connected across pin P11 and ground for determining the particular limit on current passing through the motor 86. As shown in FIG. 40, the motor current passes through the resistor R1 to ground. The voltage developed across the resistor R1 is compared by a comparator amplifier 403 (housed within the chip 401) to a reference voltage generated by the internal resistors 405, 406, 407. When the voltage across the resistor R1 reaches a predetermined value, the comparator 403 generates an output signal to trigger a one-shot 409. The timing of the one-shot 409 is established by a resistor 411 and a capacitor 413 connected in parallel across the pin P3. The output of the one-shot 409 is fed back to the internal logic of the chip 401 in order to control the turning ON and turning OFF of the motor in a current chopping fashion, as understood. This turning ON and OFF of the motor 86 serves to limit the current through the motor 86.

The pin P3 of the chip 401 is for the purpose of setting the time period for the one-shot 409 by connection of an R-C circuit to the pin P3 as shown in FIG. 40. However, the pin P3 is used differently in the circuitry of FIG. 39, in which the pin P3 provides a signal from the chip 401 indicative that the value of the current through R1 has reached a point where the one-shot 409 initiates current chopping.

The value of resistor R1 is established so that actuation of the comparator 403 (FIG. 40) does not initiate until the voltage spike 315 (FIG. 38A) occurs. When the motor 86 is driven to its far extent and the voltage spike 315 occurs, a signal is developed at the pin P3. This signal is used by the circuitry of FIG. 39 to stop the motor 86.

Referring again to FIG. 39, an operational amplifier 415 is connected as shown to from a conventional flip flop action to generate a HIGH or LOW output to the enable the pin P8 of the chip 401. Whenever the operator throws a manual switch 417, an AC coupled transition toggles the op amp 415, driving the enable line LOW. When the enable line goes LOW, the motor 86 is turned ON and driven in accordance with the direction indicated on the PH line.

The op amp 415 is toggled back to its first state (HIGH output) by the signal on the pin P3 of the chip 401. The signal on the pin P3, indicating that the voltage spike 315 has occurred, resets the op amp 415, driving the enable line (pin P8) HIGH. This shuts off the motor 86.

The transition of the enable line (P8) from HIGH to LOW, to enable the motor 86, also drives a transistor 419 so that the pin P2 of the chip is momentarily pulled HIGH. This prevents (i) the motor in-rush current spike 314 (FIG. 38a) from tripping the op amp/comparator 403 (FIG. 40), and (ii) the generation of a signal on pin P3 which would toggle the op amp 415. Thus, the motor 86 is prevented from being turned OFF by the in-rush current spike 314.

As understood, the voltage level on the pin P2 is defined in the specifications of the chip 401 and determines the level at which the motor current is chopped. In particular, 2.5 volts resides at the pin P2 in the circuitry of FIG. 39. When the enable line transitions from a HIGH to a LOW voltage level, the signal developed at the pin P2 increases momentarily above the 2.5 voltage level. Also, when the enable line transitions from LOW to HIGH, the voltage appearing at the pin P2 drops momentarily below the 2.5 voltage level. This momentary drop dynamically brakes the motor 86.

When the switch 417 is moved to point A, a voltage appears at the circuit node 421 and drives the PH pin P7 HIGH. When the switch 417 is moved to point B, the voltage at the node 421 is at ground, driving the PH pin P7 LOW. In both cases, however, the op amp 415 is toggled to drive the enable pin P8 LOW to enable the motor 86.

The node 421 is connected by the conductor 431 to three additional circuits that are the same as the circuit in the dotted block 433. Each of these additional circuits are connected to a separate shock absorber. Four such shock absorbers are typically provided in the system.

The current through the motor may be controlled using the chip in two ways. One way establishes the value of the resistor on the pin P11, and the other establishes the voltage level at the pin P2 VREF/BRK.

Figure 41:
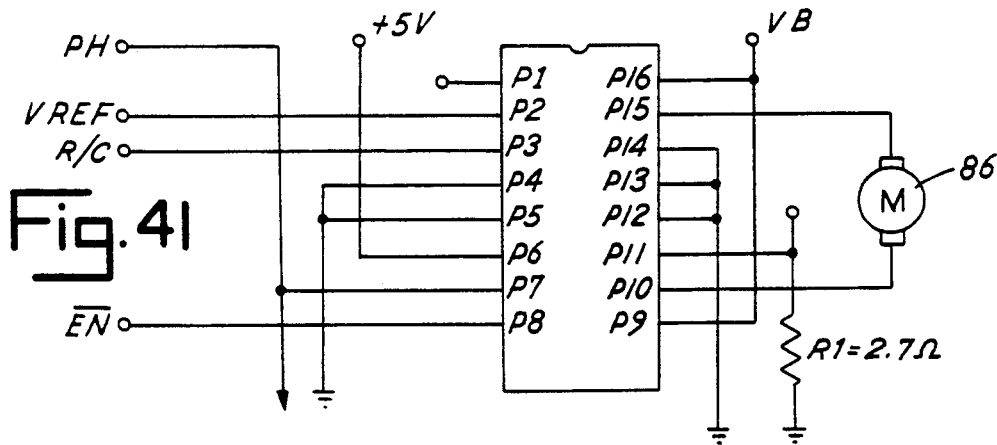
FIGS. 41, 42, and 43 are electrical schematic diagrams of another embodiment of a motor control circuitry for the shock absorber employing the piston rod of FIGS. 1 and 17.
Figure 42:
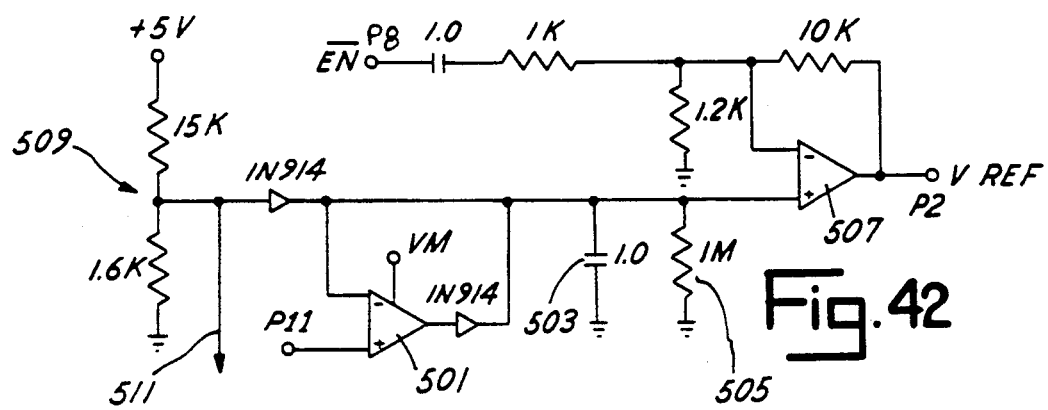
Figure 44:
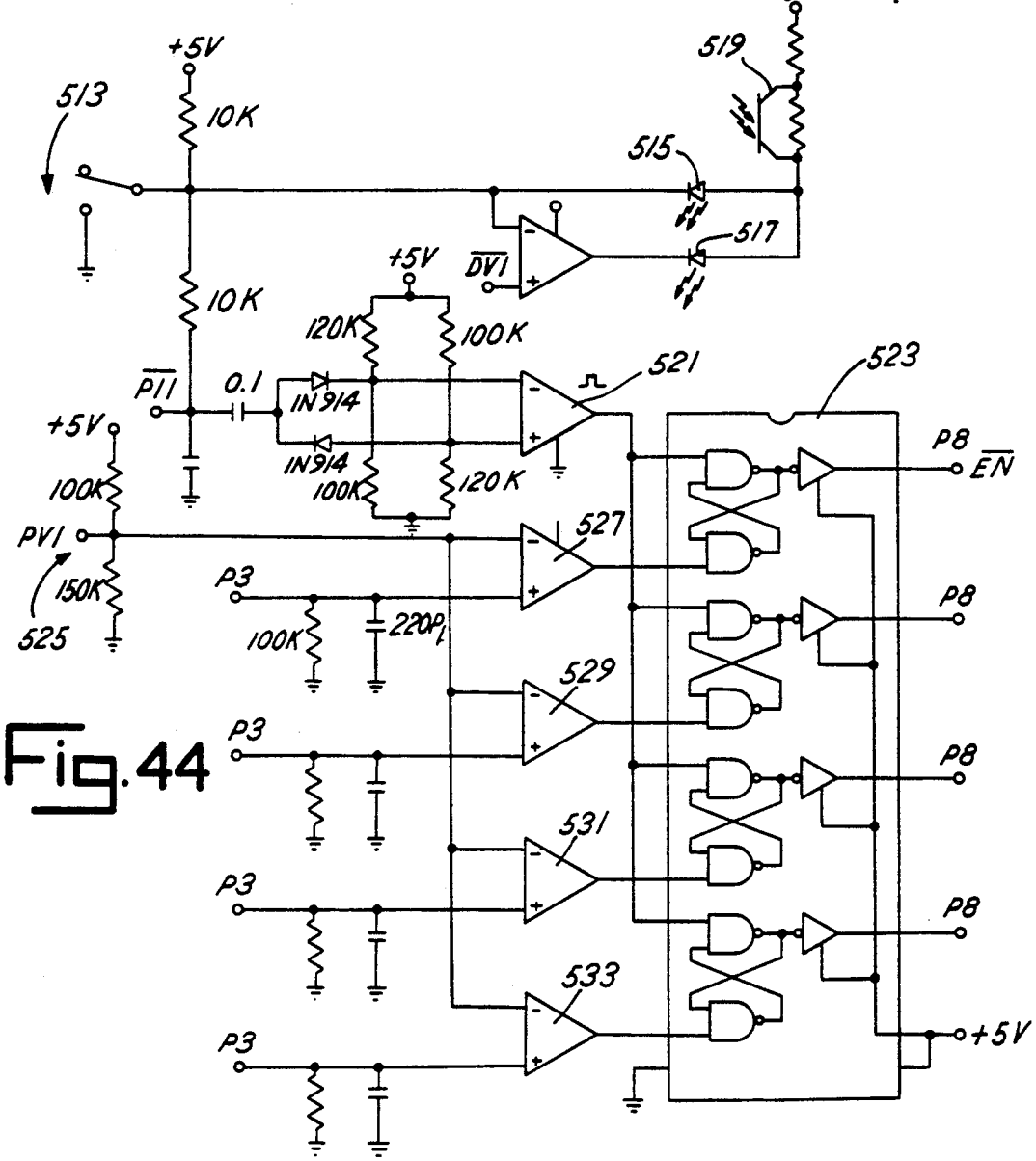
FIG. 44 and 45 are electrical schematic diagrams of another embodiment of a motor control circuitry for the shock absorber employing the piston rod of FIGS. 1 and 17.

A second embodiment of the control circuitry is shown in FIGS. 41, 42, and 44. Referring to FIG. 41, the motor 86 is connected to the chip 401 in a similar fashion as that described with respect to FIG. 39. In the circuitry embodiment of FIG. 39, the value of the resistor R1 establishes the motor current threshold level at which the motor 86 turns OFF. The chip 401 also permits the establishing of the motor current threshold level by the voltage level on the pin P2, the VREF pin.

Referring to FIG. 42, an external sensing circuit monitors the voltage across R1 that develops at the pin P11 of the chip. An op amp 501 has its non-inverting input connected to the pin P11 for receiving the voltage across the resistor R1. The op amp 501 senses the in-rush current spike 314 (FIG. 38a) and charges a capacitor 503 to the level of the in-rush spike. The level of the in-rush spike, which is directly related to the environmental temperature external to the damping system, determines the amount of charge deposited onto capacitor 503.

Figure 38B:
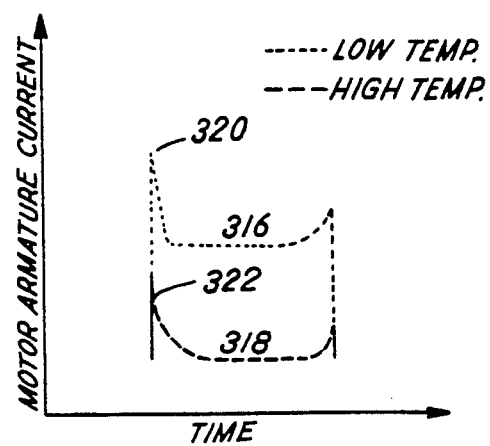

Referring to FIG. 38b, a graph compares motor current waveforms 316 and 318, which are temperature dependent representations of the waveform 312 (FIG. 38a). As the external temperature increases, the electrical resistance of the copper motor armature windings in the motor 86 increases, and the viscosity of the damping fluid decreases, which decreases the mechanical load on the motor 86. The combination of increased electrical resistance and decreased load at high temperatures decreases the driving current of the motor 86. Therefore, the in-rush current spike 322 of the waveform 318 which occurs at high temperatures has a lower absolute magnitude than the in-rush current spike 320 of the waveform 316 which occurs at low temperatures. Consequently, the voltage initially set on the capacitor 503 (FIG. 42) by the in-rush current spike varies according to temperature.

The voltage on the capacitor 503 discharges across a resistor 505. Based on the amount of time that the motor 86 rotates before stopping, the voltage across the capacitor 503 will have discharged to approximately 75% of its original stored value at the time of stopping.

An amplifier 507 amplifies the voltage developed on the capacitor 503 and generates that amplified voltage at the VREF pin P2. The voltage at VREF pin P2 varies as temperature fluctuates, changing the level at which the one shot 409 (FIG. 40) develops the signal at pin P3 to signify that the motor current threshold has been achieved. When this signal appears at pin P3, the enable signal at pin P8 is reset, causing the motor 86 to shut off.

Referring again to FIG. 42, a voltage divider 509 formed of two series connected resistors sets a default value of 2.5 volts at the pin P2. The op amp 507 amplifies the voltage across the divider 509 to develop the 2.5 volts. In addition, a transition of the enable voltage on the pin P8 from LOW to HIGH momentarily pulls the VREF voltage on the pin P2 LOW, thus causing the dynamic brake function. Also, a transition on the pin P8 from HIGH to LOW momentarily pulls the VREF voltage on the pin P2 HIGH, causing an ignoring of the in-rush current.

As will suggest itself, three additional like circuits are connected to the conductor 511 for generating the VREF voltage of the other three shock absorber circuits.

Referring to FIG. 44, an operator switch 513 is manually actuable to either one of two positions for developing a control voltage on the PH pin P7. In addition, a voltage is supplied to the LED's 515, 517 indicating which position the operator switch occupies. A phototransistor 519 is responsive to the light level surrounding the LEDs 515, 517 for dimming them in a dark environment.

The movement of the switch 513 to either position develops a voltage pulse output from the op amp 521. An array of four flip flops 523 is connected to op the amp 521 for developing an output on the enable pin P8 of each of the four shock absorbers. The flip flops 523 are reset according to the signal developed at pin P3 of each of the four shock absorbers. The voltage level DVI is developed by a voltage divider 525 formed of a pair of series connected resistors. Voltage DVI serves to set a comparator level at each of four comparators 527, 529, 531, 533 for comparison against the signal developed on the pins P3. When the voltage level developed on the pins P3 reaches the threshold voltage DV1, the respective op amp develops an output signal resetting its respective flip flop 523. This changes the EN control voltage on the pin P8 to turn OFF the motor 86.

Figure 43:
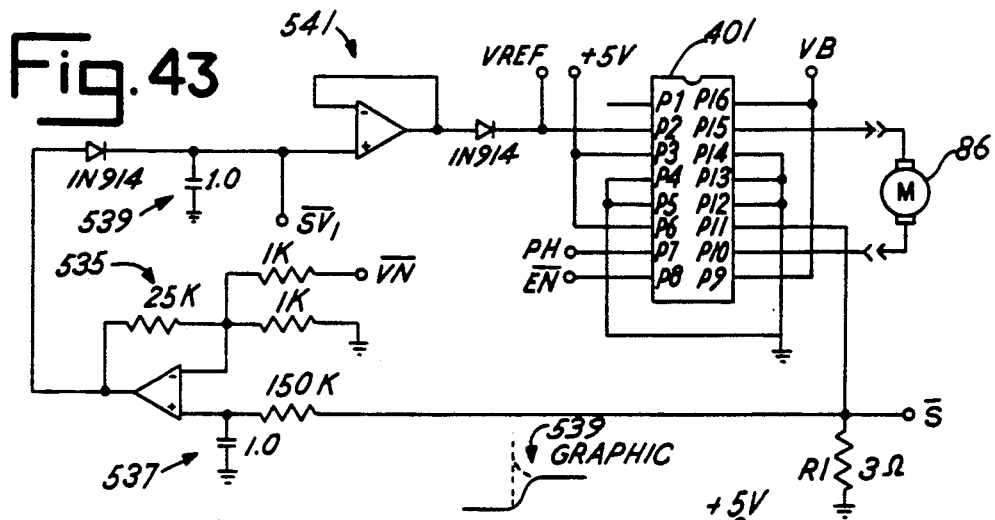
Figure 45:
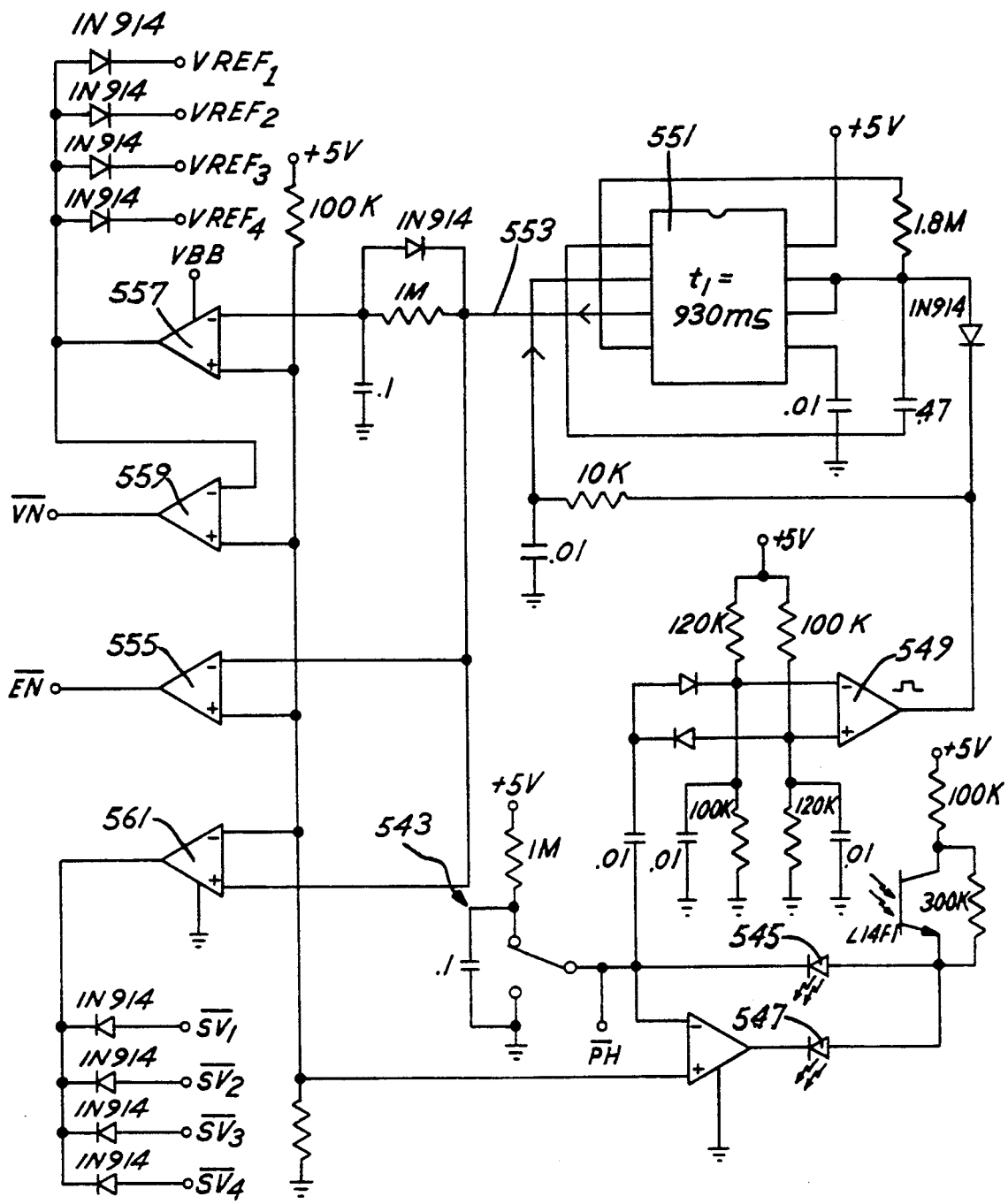

A third embodiment of the control circuitry is illustrated in FIGS. 43 and 45. The chip 401 is illustrated in FIG. 43 and is connected with inputs similar to those discussed above. The resistor R1 is connected between the pin P11 and ground, and a voltage signal similar to that shown in FIG. 38a develops across resistor R1. A sample/filter and amplifying stage 535 of FIG. 43 includes a filtering capacitor 537, which averages the in-rush peak in a manner similar to that shown at 539. The amplifying stage 535 charges a storage capacitor 539 with the average voltage developed by the capacitor 537. The average voltage stored on the capacitor 539 passes through a buffer stage 541 and then onto the VREF pin P2. As understood, the voltage appearing on the VREF pin P2 establishes a threshold level for maintaining the motor current at a certain value. When the motor current reaches a certain value as defined by the threshold signal on the pin P2, the chip 401 chops the motor current to maintain the motor current at that level. In effect, the voltage on the pin P2 is developed in accordance with the amount of current the motor is using in the primary portion of the run cycle. The motor 86 then continues to be run at that particular level. The average motor current will vary in accordance with temperature and oil viscosity as previously described.

The turning OFF of the motor 86 is performed by an independent timer rather than by the motor current. Referring to FIG. 45, a manual switch 543 develops a voltage at the PH pin P7. In addition, the signal from switch 543 drives LEDs 545, 547 in a manner similar to that described with respect to the circuitry of FIG. 44. The movement of the switch 543 toggles the op amp 549 to produce a voltage pulse output.

The voltage pulse developed by the op amp 549 triggers a timer circuit 551, which develops an output along the conductor 553 which is, in turn, amplified by an amplifier 555 to produce an enable signal at the pin 8. After 930 milliseconds, the timer circuit 551 removes its output signal from the conductor 553 to distinguish the control signal on the pin P8. This turns the motor 86 OFF. Thus, the timer 551 enables the driving of the motor 86 for a period of 930 milliseconds each time the switch 543 is actuated.

The 930 millisecond period acts as a safety feature to prevent motor burn out due to extended use. As designed, the motor 86 will be enabled for the duration of the 930 millisecond period or run cycle; however, the duration of time transpiring as the motor 86 operates in the primary portion of its run cycle will vary depending upon environmental temperature. The primary portion of the run cycle consists of the time between the occurrence of the spikes 314 and 315 (FIG. 38a). For the shock absorber shown in FIG. 2 for example, at the point where the motor 86 drives the metering pin 136 to seat against the angled periphery 142, a current spike 315 occurs, initializing current chopping that maintains the motor current at the threshold level. The current chopping will persist until the 930 millisecond period has elapsed, at which point the motor 86 shuts off and the run cycle ends. The 930 millisecond run cycle is slightly larger than the worst case caused by any environmental temperature.

For the FIG. 17 embodiment on the other hand, the current spike 315 occurs when the arms 203 of the rotatable limit arm 228 contact either of the stop faces 209 of the spacer 212. As with the FIG. 1 embodiment, this current spike 315 causes the same type of current chop, motor shut off, and run cycle termination.

In addition to the one op amp 555 already discussed, three other op amps 557, 559, 561 generate respective voltages $VREF_1$, $VN$, $SV_1$. These voltages are used in the circuitry of FIG. 43 where indicated. As will suggest itself, other like circuitry is used for providing control to all four shock absorbers.

While in the foregoing, applicants have provided a detailed description of the preferred embodiments, the description is illustrative and not itself restrictive. The scope of the present invention is thus determined by the scope of the following claims.

What is claimed is:

1. An improved remote-controlled variable damping shock absorber, the improvement comprising in combination:
   (A) a piston head connected to a piston rod;
   (B) a internal cavity extending axially within the piston rod;
   (C) a motor disposed in the internal cavity and having a drive and providing means for alternately rotating the drive in either of two directions;
   (D) a wire means passage extending from the internal cavity to a point external to the piston rod;
   (E) a wire means including a pair of wires disposed within the wire means passage and connected to the motor;
   (F) at least one fluid passage for providing fluid flow during movement of the piston head;
   (G) a valve connected to and moving in accordance with the rotation of the drive to cooperate with the fluid passage for effecting the fluid flow;
   (H) manually actuable switch means for initiating rotation of the motor; and
   (I) electrical circuitry means responsive to actuation of the switch means for providing voltage across the pair of wires to drive the motor, the electrical circuitry means including: (1) means for developing a motor voltage and a ground connection; (2) switch logic for switching the motor voltage and the ground connection between the two wires in responsive to actuation of the switch means, the switch logic including enabling means for enabling application of the motor voltage to one of the two wires in response to actuation of the switch means; and (3) stopping means for discontinuing application of the motor voltage to the two wires, the stopping means including a brushless-contactless decision means for stopping the motor at a time when the valve occupies a predetermined position with respect to the fluid passage.

2. A remote-controlled variable damping shock absorber according to claim 1 wherein the decision means includes current sensor means for monitoring the current through the motor with respect to a threshold level.

3. A remote-controlled variable damping shock absorber according to claim 2 wherein the threshold level is established after each switch actuation as a function of the current through the motor.

4. A remote-controlled variable damping shock absorber according to claim 1 wherein the decision means includes: timing means for discontinuing application of the motor voltage after a predetermined fixed time; and current chopping means for chopping the current to the motor when the current reaches a threshold level.

5. A remote controlled variable damping shock absorber according to claim 4 wherein the threshold level is established after each switch actuation as a function of current through the motor.

6. A remote-controlled variable shock absorber according to claim 1 wherein the wire means comprises only two wires penetrating the wire passage.

7. A remote-controlled variable shock absorber according to claim 2 wherein the wire means comprises only two wires penetrating the wire passage.

8. A remote-controlled variable shock absorber according to claim 3 wherein the wire means comprises only two wires penetrating the wire passage.

9. A remote-controlled variable shock absorber according to claim 4 wherein the wire means comprises only two wires penetrating the wire passage.

10. A remote-controlled variable shock absorber according to claim 5 wherein the wire means comprises only two wires penetrating the wire passage.

* * * * *